United States Patent [19]

Adachi et al.

[11] Patent Number: 4,561,699

[45] Date of Patent: Dec. 31, 1985

[54] BRAKE PRESSURE CONTROL DEVICE FOR VEHICLE BRAKING SYSTEMS

[75] Inventors: Yoshiharu Adachi; Masamoto Ando; Takashi Nagashima, all of Kariya, Japan

[73] Assignee: Aisin Seiki Kabushiki Kaisha, Kariya, Japan

[21] Appl. No.: 631,308

[22] Filed: Jul. 16, 1984

[30] Foreign Application Priority Data

Jul. 19, 1983 [JP] Japan .................. 58-112014[U]
Sep. 14, 1983 [JP] Japan .................. 58-142990[U]
Sep. 16, 1983 [JP] Japan .................. 58-144010[U]
Oct. 18, 1983 [JP] Japan .................. 58-161005[U]
Jan. 24, 1984 [JP] Japan .................. 59-8498[U]

[51] Int. Cl.[4] ............................................. B60T 8/26
[52] U.S. Cl. ................................................ 303/24 F
[58] Field of Search ............... 303/6 C, 24 A, 24 C, 303/24 F

[56] References Cited

U.S. PATENT DOCUMENTS 4,260,196 4/1981 Takata ........................ 303/6 C
4,351,570 9/1982 Young ........................ 303/24 F
4,387,932 6/1982 Shellhause .................. 303/24 F
4,390,213 6/1983 Berisch ...................... 303/24 A Primary Examiner—Duane A. Reger
Attorney, Agent, or Firm—Oblon, Fisher, Spivak, McClelland & Maier

[57] ABSTRACT

In a brake pressure control device having an inlet port for connection to a master cylinder and an outlet port for connection to a wheel brake cylinder, a differential piston cooperates with a first annular valve seat arranged in a first passage between the inlet and outlet ports, and an inertia-controlled valve element contained within a valve chamber formed in a second passage between the inlet and outlet ports to cooperate with a second annular valve seat fixed to one end portion of the piston. The one end portion of the piston is formed therein with a passage arranged to permit fluid flow passing through the second valve seat between the valve chamber and the outlet port. In such an arrangement, the valve element rests in place to be spaced from the second valve seat when the deceleration is below a predetermined value, the valve element being engaged with the second valve seat when subjected to the deceleration in excess of the predetermined value, and the piston is displaced against a spring load acting thereto to increase the space between the second valve seat and the valve element before the deceleration reaches the predetermined value under a heavy loaded condition of the vehicle.

21 Claims, 29 Drawing Figures

BRAKE PRESSURE CONTROL DEVICE FOR VEHICLE BRAKING SYSTEMS

BACKGROUND OF THE INVENTION

The present invention relates to a brake pressure control device for automotive vehicles for incorporation between a brake master cylinder and a rear wheel brake cylinder to control the ratio of brake fluid pressure being applied to the front and rear wheel brake cylinders in response to the attainment of a predetermined rate of deceleration of the vehicle, and more particularly to a brake pressure control device in which an inertia-controlled valve element such as a metallic ball cooperates with a valve seat in a valve chamber to control the ratio of brake fluid pressure being applied to the front and rear wheel brake cylinders and in which the initial space between the valve element and the valve seat changes in response to increase or decrease of the master cylinder pressure.

As is illustrated in FIG. 1, a conventional brake pressure control device 10 of this kind comprises a housing assembly 11 provided with an inlet port 11a for connection to a brake master cylinder and an outlet port 11b for connection to a rear wheel brake cylinder, a pressure responsive piston 15 axially slidably disposed within a stepped bore 11c in housing assembly 11 to form fluid chambers 12, 13, 17 and an air chamber 14, a compression coil spring 16 disposed within the fluid chamber 13 to bias the piston 15 rightwards in the figure, an inertia-controlled valve element 18 in the form of a metallic ball disposed within the fluid chamber 17 in open communication with the fluid chamber 13 via a passage 11d, and a plunger 20 carried by a spring 19 to receive the valve element 18 thereon and to be displaced by the pressure in fluid chamber 17. The housing assembly 11 is fixedly mounted on a vehicle body structure at an angle 0 relatively to a horizontal line in such a manner that the axis of the axial bore 11c is located in a fore-and-aft direction of the vehicle. Under inoperative condition of the brake system, the piston 15 and plunger 20 are held by respective loads of springs 16 and 19 in their initial positions shown in the figure, and the inlet port 11a is in open communication with the outlet port 11b via fluid chamber 13, passage 11d, fluid chamber 17 and a space between the valve element 18 and a valve seat 11e in fluid chamber 17.

In braking operation, the pressure PW applied to the rear wheel brake cylinder increases at the same rate as that of the master cylinder pressure PM. (see FIG. 2) When the master cylinder pressure PM reaches a level A on the graph of FIG. 2, the piston 15 displaces against spring 16, and a projection 15a of piston 15 retracts to permit engagement of the valve element 18 with the valve seat 11e. If the vehicle is being applied with a light load, the deceleration of the vehicle will exceed a predetermined value in response to further increase of the master cylinder pressure PM to a level B on the graph of FIG. 2. In such a condition, the valve element 18 starts to engage the valve seat 11e so as to interrupt the fluid communication between inlet and outlet ports 11a and 11b, while the piston 15 abuts against the end wall of air chamber 14. Further increase of the rear wheel brake cylinder pressure PW from the level B to a level C will be effected until engagement of the valve element 18 with the valve seat 11e is effected. During further increase of the master cylinder pressure PM up to a level D, the rear wheel brake cylinder pressure PW will be maintained at the level C. When master cylinder pressure PM exceeds the level D, the piston 15 will displace rightwards to disengage the valve element 18 from the valve seat 11e so as to permit further increase of the rear wheel brake cylinder pressure PW under control of the piston 15.

If the vehicle is being applied with a heavy load in the braking operation, the deceleration of the vehicle will exceed the predetermined value when the master cylinder pressure PM has increased to a level F. During such increase of the master cylinder pressure PM to level F, the plunger 20 will retract against spring 19, and the valve element 18 will roll rearwardly to increase the space between the valve element 18 and the valve seat 11e. As a result, a time necessary for engagement of the valve element 18 with the valve seat 11e becomes longer than that under the light loaded condition of the vehicle. Consequently, the pressure increase from level F to a level G becomes larger than that from level B to level C on the graph of FIG. 2. Thereafter, the rear wheel brake cylinder pressure PW will be controlled substantially as same as that under the light loaded condition of the vehicle.

In operation of such conventional devices as described above, there occurs a time delay when the valve element 18 rolls rearwardly by its inertia in response to retraction of the plunger 20 against spring 19. The valve element 18 tends to rest in place by its gravity when the plunger 20 is retracted. Rearward rolling of the valve element 18 towards the plunger 20 is delayed by the difference in pressure acting on the valve element 18, and the space between the valve element 18 and the valve seat 11e is reduced due to forward movement of the valve element 18 caused by the difference in pressure. For these reasons, when the brake pedal is rapidly depressed, the valve element 18 does not retract in response to retraction of the plunger 20 and tends to roll forwardly prior to engagement with the piston 20. This results in unstable control of the master cylinder pressure.

SUMMARY OF THE INVENTION

It is, therefore, a primary object of the present invention to provide an improved brake pressure control device which is arranged to increase in a reliable manner the initial space between the valve element and the valve seat in response to increase of the master cylinder pressure thereby to effect stable control of the wheel brake cylinder pressure in rapid braking operation.

Another object of the present invention is to provide an improved brake pressure control device, having the above-described characteristic, capable of effecting sufficient braking force under a heavy loaded condition of the vehicle without causing any excessive increase of the braking force under a light loaded condition of the vehicle.

According to the present invention, the primary object of the present invention is accomplished by providing an improved brake pressure control device which comprises a housing provided with an inlet port for connection to a master cylinder, an outlet port for connection to a wheel brake cylinder, and a stepped bore in open communication with the inlet and outlet ports, a pressure responsive piston in the form of a differential piston axially slidably disposed within the stepped bore to subdivide the interior of the housing into first, second and third fluid chambers, the first fluid chamber being in open communication with the inlet port, the second fluid chamber being in open communication with the outlet port, and the third fluid chamber being in open communication with the inlet port and with the outlet port through the second fluid chamber, the piston being formed at one end portion thereof with a passage for providing a fluid communication between the first and second fluid chambers and at an intermediate portion thereof with a valve part located within the second fluid chamber, and a first annular valve seat arranged within the stepped bore between the second and third fluid chambers to cooperate with the valve part of the piston for controlling the flow of fluid between the second and third fluid chambers. The control device further comprises a spring arranged within the third fluid chamber for loading the piston towards the first fluid chamber and retaining it in an initial position in which the valve part of the piston is spaced from the first annular valve seat, a second annular valve seat fixed to the one end portion of the piston, the second annular valve seat being exposed within the first fluid chamber and arranged in surrounding relationship with the passage in the piston, and an inertia-controlled valve element in the form of a ball contained within the first fluid chamber to cooperate with the second annular valve seat, the valve element being placed in an initial position in which it is in abutment with an end wall of the stepped bore to be spaced from the second annular valve seat when the deceleration of the vehicle is below a predetermined value, and the valve element being brought into engagement with the second annular valve seat when subjected to the deceleration of the vehicle in excess of the predetermined value, wherein the piston is arranged to be displaced against the spring to increase a space between the second annular valve seat and the valve element before the deceleration of the vehicle reaches the predetermined value under a heavy loaded condition.

To accomplish the secondary object of the present invention, the control device further comprises a sleeve member arranged in surrounding relationship with the piston in the third fluid chamber to be applied with a hydraulic pressure from the master cylinder through the inlet port and to be axially displaced by the hydraulic pressure towards the second fluid chamber, wherein the spring is engaged at one end thereof with the piston and at the other end thereof with the sleeve member to increase the spring load acting on the piston under a heavy loaded condition of the vehicle.

According to an aspect of the present invention, the sleeve member is arranged to be engaged with an annular shoulder of the piston in the third fluid chamber when axially displaced against the load of the spring acting on the piston.

In another aspect of the present invention, the control further comprises a sleeve member arranged in surrounding relationship with the piston in the third fluid chamber and retained in place by abutment with an annular shoulder in the stepped bore to be axially moved, wherein the first annular valve seat is an annular sealing member secured to the inner periphery of the piston, and the spring is engaged at one end thereof with the piston and sleeve member and at the other end thereof with an end wall of said stepped bore. Preferablly, the piston is formed therein with an orifice located in the passage for the fluid communication between the first and second fluid chambers.

BRIEF DESCRIPTION OF THE DRAWINGS

Additional objects and advantages of the present invention will be readily apparent from the following detailed description of various preferred embodiments thereof when taken together with the accompanying drawings, in which.

DETAILED DESCRIPTION OF THE PREFERRED EMBODIMENTS

Figure 1:
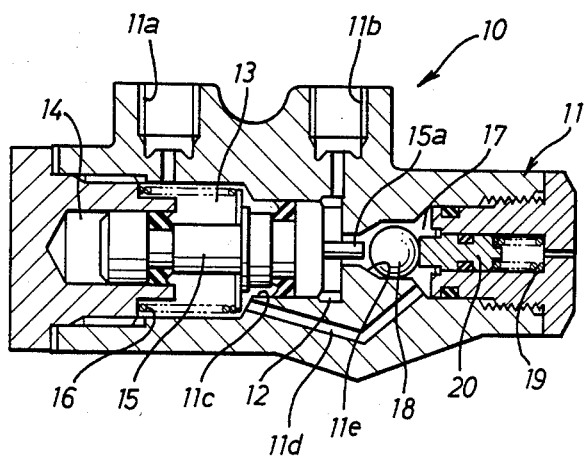
FIG. 1 is a sectional view of a conventional brake pressure control device.
Figure 2:
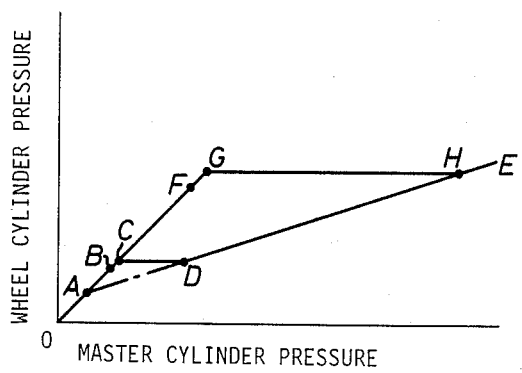
FIG. 2 is a graph illustrating a pressure control characteristic of the device shown in FIG. 1.
Figure 3:
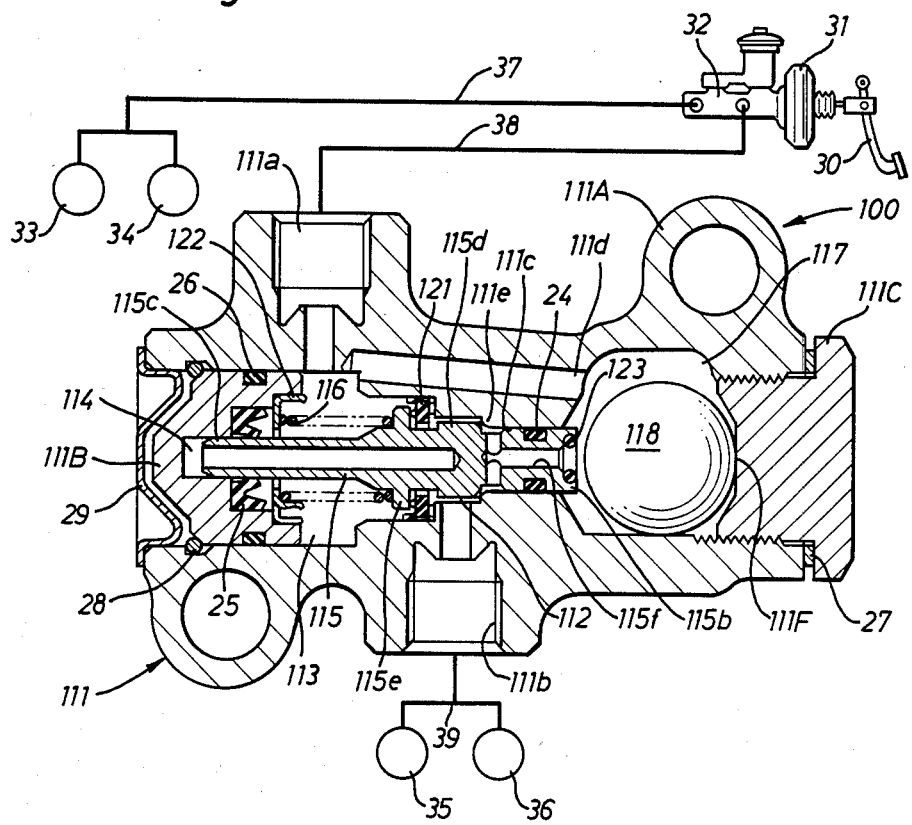
FIG. 3 is a sectional view of a first embodiment of a brake pressure control device according to the present invention.

Referring now to the drawings, FIG. 3 illustrates a first embodiment of a brake pressure control device 100 in accordance with the present invention. The brake pressure control device 100 comprises a housing assembly 111 including a housing body 111A and a pair of plugs 111B and 111C fastened to the opposite ends of housing body 111A in a fluid tight manner. The housing body 111A is provided with inlet and outlet ports 111a and 111b respectively in connection to a tandem master cylinder 32 via a conduit 38 and to rear wheel brake cylinders 35, 36 via a conduit 39. A pressure responsive piston 115 in the form of a differential piston is axially slidably disposed within a stepped axial bore 111c in housing body 111A to form first, second and third fluid chambers 117, 112 and 113 and an air chamber 114. The right end portion 115b of piston 115 is larger in diameter than the left end portion 115c of piston 115. The first fluid chamber 117 communicates into the third fluid chamber 113 via a passage 111d and further into the inlet port 111a. The second fluid chamber 112 is in open communication with the outlet port 111b, and the third fluid chamber 113 is in open communication with the inlet port 111a. The piston 115 is formed at its intermediate portion with an annular valve part 115d which is located within the second fluid chamber 112 to be engaged with a first annular valve seat 121 in response to leftward movement of the piston 115. The first annular valve seat 121 is supported in place by abutment with an annular shoulder 111e in the stepped axial bore 111c to cooperate with the annular valve part 115d of piston 115 so as to control the fluid communication between the second and third fluid chambers 112 and 113. The piston 115 is biased rightwards by means of a compression coil spring 116 which is engaged at its one end with an annular flange 115e of piston 115 and at its other end with an inner shoulder of plug 111B through an annular retainer 122. Rightward movement of piston 115 is restricted by abutment against the annular shoulder 111e in bore 111c to define the initial position of piston 115.

The pressure responsive piston 115 is formed in its right end portion with a passage 115f including axial and radial holes which are arranged to provide a fluid communication between the first and second fluid chambers 117 and 112. A second annular valve seat 123 is secured to the right end of piston 115 and surrounds the passage 115f. Contained within the first fluid chamber 117 is an inertia-controlled valve element 18 in the form of a metallic ball which coopertes with the second annular valve seat 123 to provide a cut-off valve. In use of the control device 100, the housing body 111 is fixedly mounted on a vehicle body structure at an angle 0 relatively to a horizontal line and arranged in a fore-and-aft direction of the vehicle. When the vehicle is stopped, the valve element 118 is received by a stopper face 111F of plug 111C to be located in its initial position. When subjected to the deceleration of the vehicle in excess of a predetermined value, the valve element 118 will start to roll forwardly towards the second valve seat 123.

Additionally, in FIG. 3 the reference numerals 24, 25, 26 and 27 each designate a sealing member, the reference numeral 28 designates a stopper ring for plug 111B, and the reference numeral 29 designates a dust cover for plug 111B. Furthermore, the reference numerals 30 and 31 designate respectively the brake pedal of the vehicle and a brake booster for the tandem master cylinder 32. The reference numerals 33 and 34 designate front wheel brake cylinders connected to the master cylinder 32 via a conduit 37.

Figure 4:
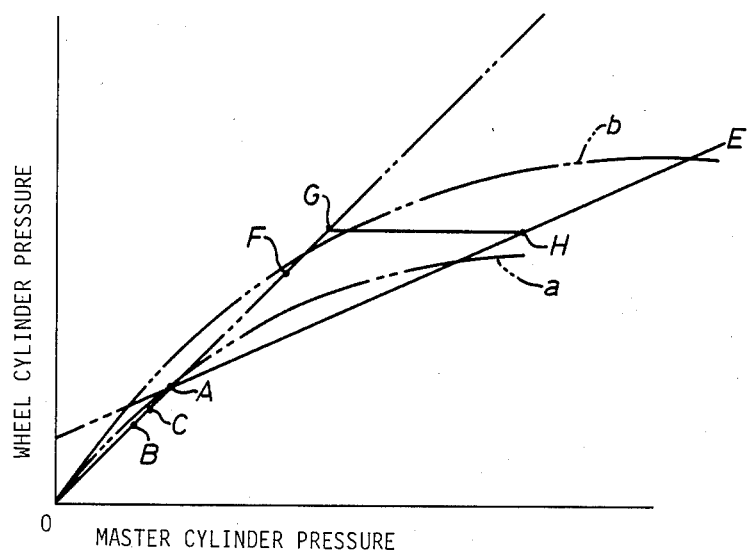
FIG. 4 is a graph illustrating a pressure control characteristic of the device shown in FIG. 3.

In FIG. 4 there is illustrated a pressure control characteristic of the brake pressure control device 100, in which a first imaginary line a indicates an ideal proportion curve under a light loaded condition of the vehicle, and a second imaginary line b indicates an ideal proportion curve under a heavy loaded condition of the vehicle. In the graph of FIG. 4, a level B on a solid line represents a hydraulic pressure PW applied to the rear wheel brake cylinders 35, 36 when subjected to the deceleration of the vehicle in excess of a predetermined value under the light loaded condition, and a level F on the solid line represents a hydraulic pressure PW applied to the rear wheel brake cylinders 35, 36 when subjected to the deceleration of the vehicle in excess of the predetermined value under the heavy loaded condition. A segment A-E is determined on a basis of the following equation.

$$PW = \{1 - AS/(AV - AL)]\}PM + FP/(AV - AL)$$

where
PW: the hydraulic pressure applied to the rear wheel cylinders,
PM: the master cylinder pressure,
AS: an effective sealing area between the left end portion 115c of piston 115 and the inner wall of stepped bore 111c,
AV: an effective sealing area between the annular valve part 115d and the first annular valve seat 121,
AL: an effective sealing area between the right end portion 115b of piston 115 and the inner wall of stepped bore 111c,
FP: a load of spring 116 acting on piston 115 when the annular valve part 115d of piston 115 is brought into engagement with the first annular valve seat 121.

In the first embodiment, the above equation is realized on a basis of a relationship $AV > AL$, which equation is also realized on a basis of a relationship $AV < AL$. Furthermore, the initial load of spring 116 is determined to hold the piston 115 in its initial position even when the master cylinder pressure PM has increased to level B on the graph of FIG. 4. In necessity, the initial load of spring 116 may be determined in such a manner that the piston 115 displaces slightly against spring 116 when the master cylinder pressure PM has increased to the level B.

Assuming that the brake pedal 30 of the vehicle is depressed to operate the tandem master cylinder 32, the master cylinder pressure PM is directly applied to the front wheel brake cylinders 33 and 34 via conduit 37, while the master cylinder pressure PM is applied to the rear wheel brake cylinders 35 and 36 via the conduit 38, pressure control device 10 and conduit 39. In the pressure control device 10, the pressurized fluid is supplied into the inlet port 111a and flows into the outlet port 111b through the third fluid chamber 113, first annular valve seat 121 and second fluid chamber 112. The pressurized fluid further flows into the outlet port 111b through the third fluid chamber 113, passage 111d, first fluid chamber 17, passage 115f and second fluid chamber 112. Assuming that the vehicle is being applied with a light load, the deceleration of the vehicle will exceed the predetermined value when the master cylinder pressure PM has increased to the level B on the graph of FIG. 4. Under such a condition, the valve element 118 will start to roll forwardly towards the second annular valve seat 123. When the master cylinder pressure PM has increased to the level C on the graph of FIG. 4, engagement of the valve element 118 with the valve seat 123 is effected to interrupt the fluid communication between the first and second fluid chambers 117 and 112. Subsequently, the piston 115 will move unitedly with the valve element 118 in response to further increase of the master cylinder pressure PM to cooperate with the first annular valve seat 121 so as to effect a pressure proportioning action. Thus, the rear wheel brake cylinder pressure PW will be controlled as is illustrated by a characteristic line O-A-E in FIG. 4.

Assuming that the vehicle is being applied with a heavy load in the braking operation, the valve element 118 will start to roll forwardly towards the annular valve seat 123 when the master cylinder pressure PM has increased to the level F in FIG. 4. During such increase of the pressure PM to the level F, the piston 115 will displace against the load of spring 116 to increase the initial space between the valve element 118 and the second annular valve seat 123. When the master cylinder pressure PM has increased to a level G, engagement of the valve element 118 with the valve seat 123 will be effected to interrupt the fluid communication between the first and second fluid chambers 117 and 112. Thus, the rear wheel brake cylinder pressure PW will be maintained at the level G during further increase of the master cylinder pressure PM. When the master cylinder pressure PM has increased to a level H, the piston 115 will move unitedly with the valve element 118 to cooperate with the first annular valve seat 121 so as to effect the pressure proportioning action. Consequently, the rear wheel brake cylinder pressure PW will be controlled as is illustrated by a characteristic line O-F-G-H-E in FIG. 4. In such operation, it will be noted that the difference between levels F and G under the heavy loaded condition of the vehicle becomes larger than the difference between levels B and C under the light loaded condition of the vehicle. This ensures stable control of the master cylinder pressure PM even when the brake pedal 30 is rapidly depressed.

When depression of the brake pedal 30 is released, the valve element 118 disengages from the second annular valve seat 123 to permit the flow of braking fluid from the rear wheel brake cylinders 35, 36 to the master cylinder 32 via passage 115f in piston 115. Subsequently, the annular valve part 115d of piston 115 disengages from the first annular valve seat 121 to permit the flow of braking fluid from the rear wheel brake cylinders 35, 36 via the first annular valve seat 121. Thus, the rear wheel brake cylinder pressure PW is released.

Figure 5:
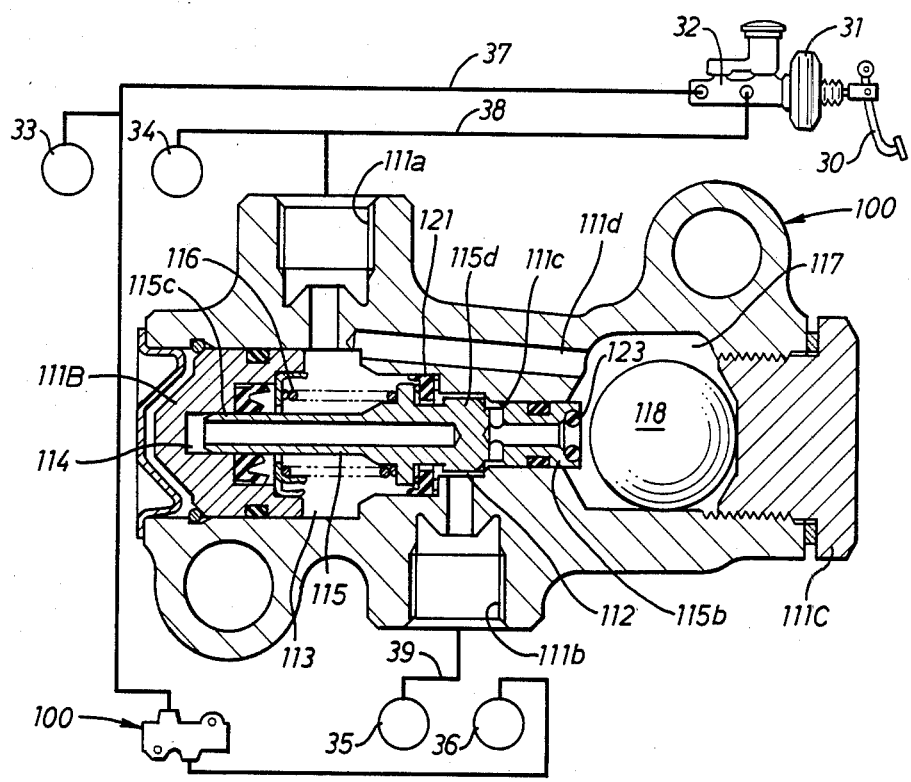
FIG. 5 illustrates an application of the device to a vehicle braking system of the diagonal type.

Although in the first embodiment the pressure control device 100 is interposed between the conduits 38 and 39, it may be adapted to a braking system of the diagonal type as is illustrated in FIG. 5. In such adaptation, two pressure control devices 100 are respectively disposed within a first conduit between the master cylinder 32 and the left-side rear wheel brake cylinder 35 and a second conduit between the master cylinder 32 and the right-side rear wheel brake cylinder 36. In the actual practices, it is desirable that the two pressure control devices 100 are constructed in a piece.

Figure 6:
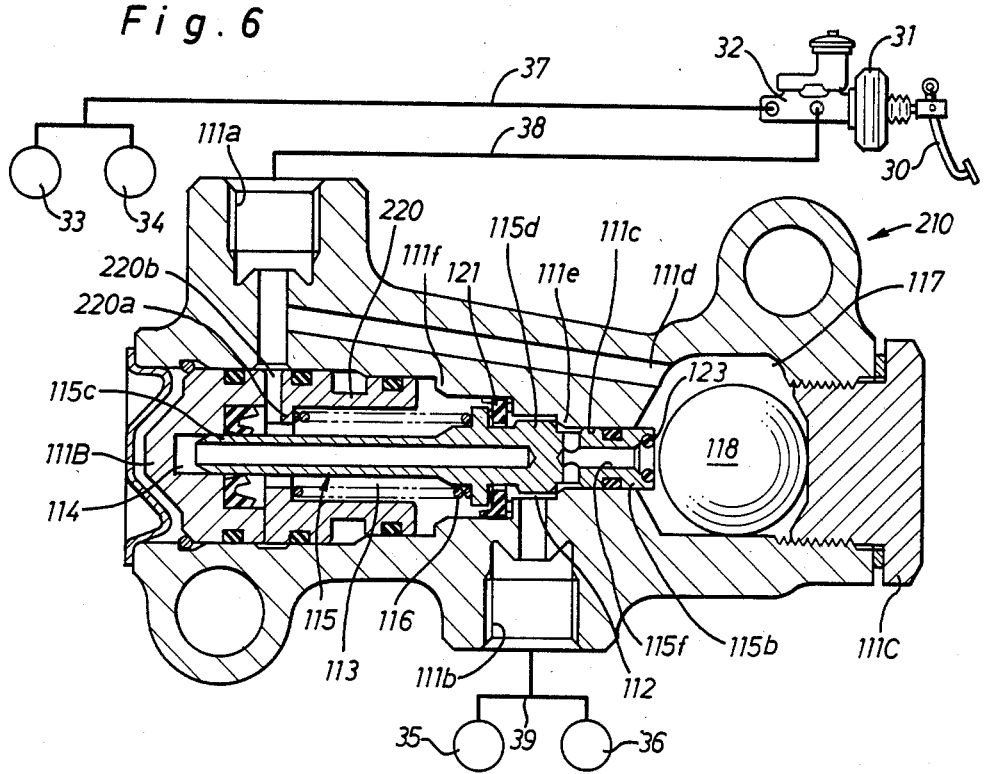
FIG. 6 is a sectional view of a second embodiment of a brake pressure control device according to the present invention.

In FIG. 6 there is illustrated a second embodiment of the present invention, in which a brake pressure control device 210 comprises a pressure responsive sleeve member 220 in surrounding relationship with the piston 115 and axially movable in the stepped bore 111c of housing assembly 111. The sleeve member 220 is formed at the left end portion thereof with an annular shoulder 220a and a radial groove 220b and is arranged to be movable between the inner end of plung 111B and an annular shoulder 111f in stepped bore 111c. In such an arrangement, the left end of compression spring 116 is engaged with the annular shoulder 220a of sleeve member 220 to bias the piston 115 rightwards in the figure. The load of spring 116 is determined to hold the piston 115 in its initial position until the rear wheel cylinder pressure PW reaches a first level to cause the predetermined deceleration of the vehicle under a light loaded condition and further to permit lefward movement of the piston 115 from its initial position before the rear wheel cylinder pressure PW reaches a second level to cause the predetermined deceleration of the vehicle under a heavy loaded condition. Furthermore, an annular sealing area between the left end portion 115c of piston 115 and the inner wall of stepped bore 111c is determined to be smaller than the difference between an annular sealing area between the annular valve part 115d of piston 115 and the first annular valve seat 121 and an annular sealing area between the right end portion 115b of piston 115 and the inner wall of stepped bore 111c. Other component parts and portions are substantially same as those in the first embodiment and indicated by the same reference numerals.

Figure 7:
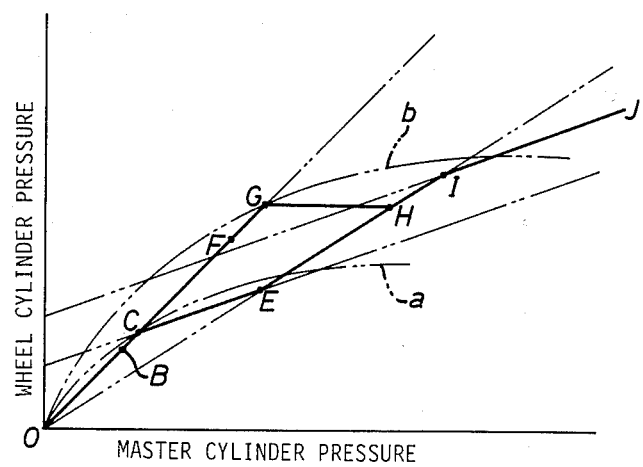
FIG. 7 is a graph illustrating a pressure control characteristic of the device shown in FIG. 6.

In FIG. 7 there is illustrated a pressure control characteristic of the brake pressure control device 210, in which a first imaginary line a indicates an ideal proportion curve under the light loaded condition of the vehicle, and a second imaginary line b indicates an ideal proportion curve under the heavy loaded condition of the vehicle. In the graph of FIG. 7, a level B on a solid line represents a hydraulic pressure PW applied to the rear wheel brake cylinders 35, 36 when subjected to the deceleration of the vehicle in excess of the predetermined value under the light loaded condition, and a level F on the solid line represents a hydraulic pressure PW applied to the rear wheel brake cylinders 35, 36 when subjected to the deceleration of the vehicle in excess of the predetermined value under the heavy loaded condition. A segment C-E is determined on a basis of the following equation.

$$PW = \{1 - [AS/(AV-AL)]\}PM + FP/(AV-AL) \tag{1}$$

where all the characters are substantially same as those in the first embodiment.

In FIG. 7, a segment E-I is obtainable during rightward movement of the sleeve member 220, which segment is determined by the following equation.

$$PW = \{[1 - AS/(AV-AL)] + [(AB-AC)/(AV-AL)]\}PM \tag{2}$$

where
- AB: an effective sealing area between a large diameter portion of the sleeve member 220 and the inner wall of stepped bore 111c,
- AC: an effective sealing area between a small diameter portion of the sleeve member 220 and the inner wall of stepped bore 111c, and where AS is smaller than AV−AL and larger than AB−AC.

Assuming that the control device 210 is applied with the master cylinder pressure PM under the light loaded condition of the vehicle, the deceleration of the vehicle will exceed the predetermined value when the master cylinder pressure PM has increased to the level B on the graph of FIG. 7. Under such a condition, the valve element 118 will start to roll forwardly towards the second annular valve seat 123. When the master cylinder pressure PM has increased to the level C on the graph of FIG. 7, engagement of the valve element 118 with the valve seat 123 is effected to interrupt the fluid communication between the first and second fluid chambers 117 and 112. Subsequently, the piston 115 will move unitedly with the valve element 118 in response to further increase of the master cylinder pressure PM to cooperate with the first annular valve seat 121 so as to effect the pressure proportioning action. Thus, the rear wheel brake cylinder pressure PW is controlled as is illustrated by a characteristic line O-C-E in FIG. 7. When the master cylinder pressure PM further increases, the sleeve member 220 will move rightwards in the figure. During rightward movement of the sleeve member 220, the rear wheel brake cylinder pressure PW will be controlled by the pressure proportioning action of piston 115 as is illustrated by a segment of E-I in FIG. 7. After abutment of the sleeve member 220 against the annular shoulder 111f, the rear wheel brake cylinder pressure PW will be controlled by the pressure proportioning action of piston 115 in response to further increase of the master cylinder pressure PM as is illustrated by a segment of I-J.

Assuming that the control device 210 is applied with the master cylinder pressure PM under the heavy loaded condition of the vehicle, the valve element 118 will start to roll forwardly towards the annular valve seat 123 when the master cylinder pressure PM has increased to the level F in FIG. 7. During such increase of the master cylinder pressure PM, the piston 115 will displace against the load of spring 116 and abut against the first annular valve seat 121 to increase the initial space between the valve element 118 and the second annular valve seat 123. When the master cylinder pressure PM has increased to a level G, engagement of the valve element 118 with the valve seat 123 will be effected to interrupt the fluid communication between the first and second fluid chambers 117 and 112 so as to maintain the rear wheel brake cylinder pressure PW at the level G during further increase of the master cylinder pressure PM. When the master cylinder pressure PM has increased to a level H, the piston 115 will move unitedly with the valve element 118 to cooperate with the first annular valve seat 121 so as to effect the pressure proportioning action. When the master cylinder pressure exceeds the level H, the sleeve member 220 will move rightwards to increase the load of spring 116. During rightward movement of the sleeve member 220, the rear wheel brake cylinder pressure PW will be controlled by the pressure proportioning action of piston 115, as is illustrated by a segment of H-I in FIG. 7. After abutment of the sleeve member 220 against the annular shoulder 111f, the rear wheel brake cylinder pressure PW will be controlled by the pressure proportioning action of piston 115 in response to further increase of the master cylinder pressure PM, as is illustrated by a segment of I-J in FIG. 7. Consequently, the rear wheel brake cylinder pressure PW will be controlled as is illustrated by a characteristic line O-F-G-H-I-J in FIG. 7. In such operation, it will be noted that the difference between levels F and G under the heavy loaded condition of the vehicle becomes larger than the difference between levels B and C under the light loaded condition of the vehicle. This ensures stable control of the rear wheel brake cylinder pressure PW even when the brake pedal 30 is rapidly depressed. Furthermore, provision of the sleeve member 220 serves to effect the pressure control between levels E and I and between levels H and I respectively under the light and heavy loaded conditions of the vehicle. As a result, sufficient braking force of the vehicle is effected under the heavy loaded condition without causing any decrease of the braking force under the light loaded condition.

Figure 8:
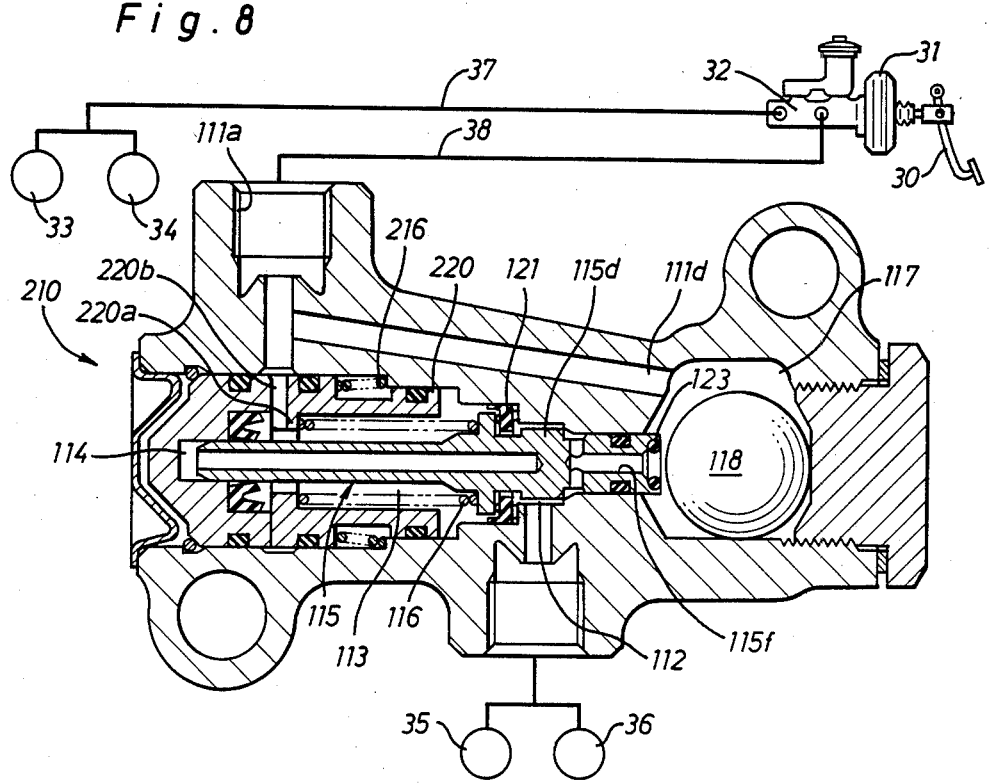
FIGS. 8, 10, 12 and 14 illustrate modifications of the second embodiment.
Figure 9:
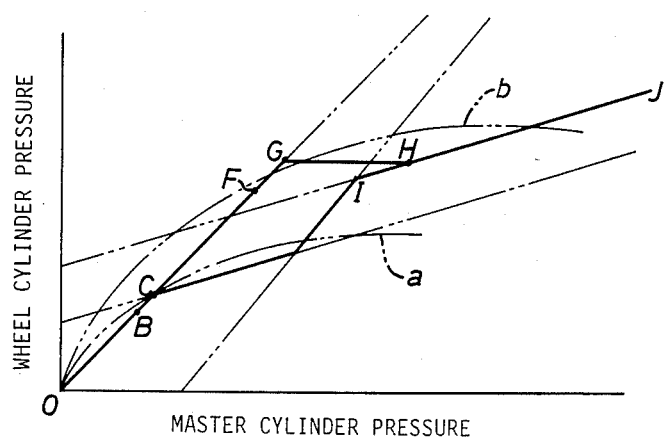
FIGS. 9, 11 and 13 illustrate respective pressure control characteristics of the modifications shown in FIGS. 8, 10 and 12.

In FIG. 8 there is illustrated a modification of the brake pressure control device 210 wherein a compression coil spring 216 is further arranged in surrounding relationship with the sleeve member 220. The compression coil spring 216 is engaged at its one end with the sleeve member 220 and at its other end with an annular shoulder in stepped bore 111c to bias the sleeve member 220 leftwards against the master cylinder pressure PM. In this modification, as is illustrated in FIG. 9, the level I on the characteristic line of FIG. 7 is displaced towards the level E owing to provision of the coil spring 216.

Figure 10:
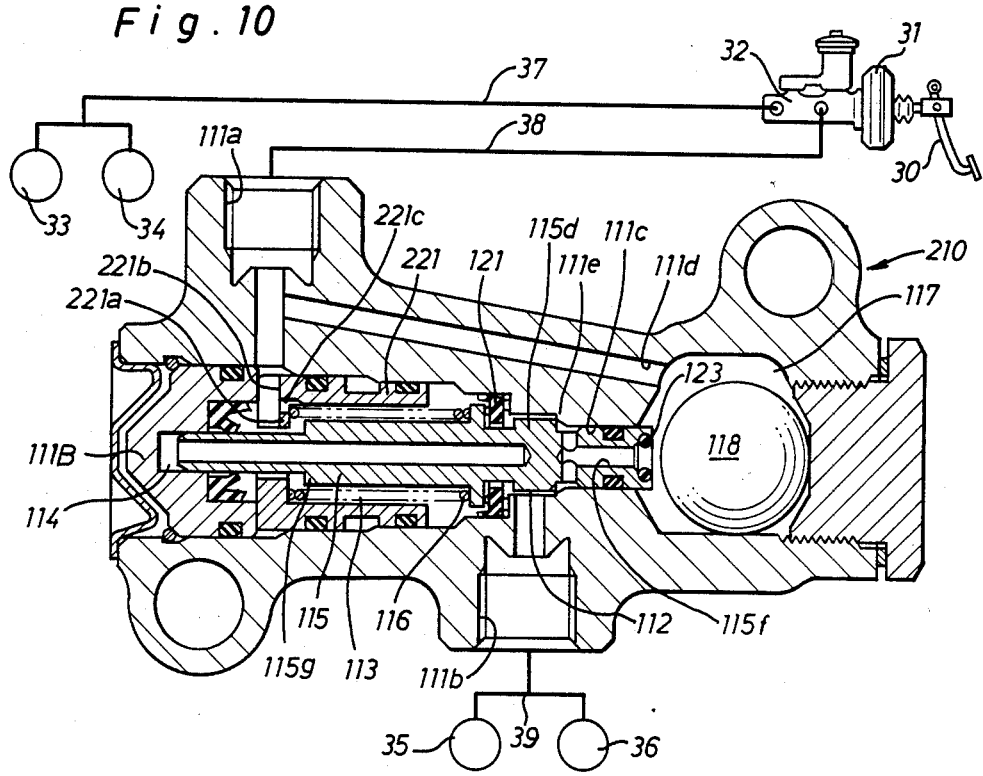

In FIG. 10 there is illustrated another modification of the brake pressure control device 210 wherein the sleeve member 220 of FIG. 6 is replaced with a sleeve member 221 axially movable in the stepped bore 111c. The sleeve member 221 is formed at the left end portion thereof with an annular shoulder 221a, a radial groove 221b and an axial hole 221c. The radial groove 221b is in open communication with the inlet port 111a and with an annular space around piston 115 through the axial hole 221c. The inner annular shoulder 221a of sleeve member 221 is smaller in diameter than an annular shoulder 115g of piston 115 to be abut against piston 115 in its rightward movement. Other component parts and portions are substantially same as those of the second embodiment.

Figure 11:
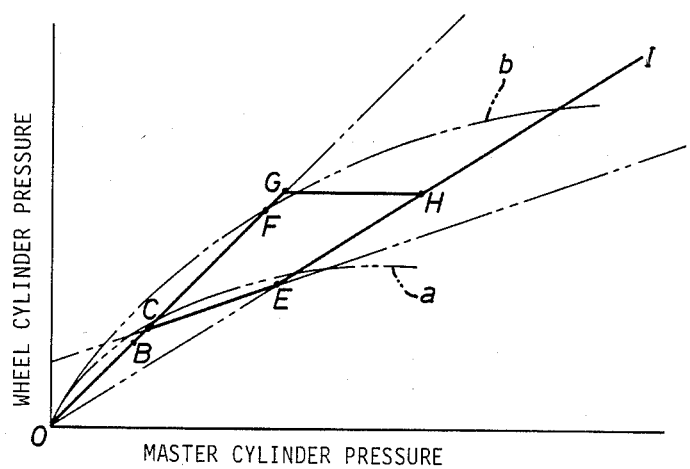

Assuming that the control device 210 of FIG. 10 is applied with the master cylinder pressure PM under the light loaded condition of the vehicle, the deceleration of the vehicle will exceed the predetermined value when the master cylinder pressure PM has increased to a level B on the graph of FIG. 11. Under such a condition, the valve element 118 will start to roll forwardly towards the second annular valve seat 123. When the master cylinder pressure PM has increased to a level C on the graph of FIG. 11, engagement of the valve element 118 with the valve seat 123 will be effected to interrupt the fluid communication between the first and second fluid chambers 117 and 112. Subsequently, the piston 115 will move unitedly with the valve element 118 in response to further increase of the master cylinder pressure PM to cooperate with the first annular valve seat 121 so as to effect the pressure proportioning action. Thus, the rear wheel brake cylinder pressure PW is controlled as is illustrated by a characteristic line O-C-E in FIG. 11. When the master cylinder pressure PM further increases, the sleeve member 221 will move rightwards against spring 116 and abut against the annular shoulder 115g of piston 115 at its annular shoulder 221a. During further increase of the master cylinder pressure PM, the sleeve member 221 will move unitedly with the piston 115 to effect the pressure proportioning action. In such operation, the pressure receiving area of piston 115 will increase to control the rear wheel brake cylinder pressure PW as is illustrated by a segment of E-I in FIG. 11.

Assuming that the control device 210 of FIG. 10 is applied with the master cylinder pressure PM under the heavy loaded condition of the vehicle, the valve element 118 will start to roll forwardly towards the annular valve seat 123 when the master cylinder pressure PM has increased to a level F in FIG. 11. During such increase of the master cylinder pressure PM, the piston 115 will displace against the load of spring 116 and abut against the first annular valve seat 121 to increase the initial space between the valve element 118 and the second annular valve seat 123. When the master cylinder pressure PM has increased to a level G, engagement of the valve element 118 with the valve seat 123 will be effected to interrupt the fluid communication between the first and second fluid chambers 117 and 112 so as to maintain the rear wheel brake cylinder pressure PW at the level G during further increase of the master cylinder pressure PM. When the master cylinder pressure PM has increased to a level H, the sleeve member 221 will abut against the annular shoulder 115g of piston 115. As a result, the piston 115 will move unitedly with the sleeve member 221 and the valve element 118 to cooperate with the first annular valve seat 121 thereby to effect the pressure proportioning action. Thus, the rear wheel brake cylinder pressure PW will be controlled as is illustrated by a characteristic line O-F-G-H-I in FIG. 11.

Figure 12:
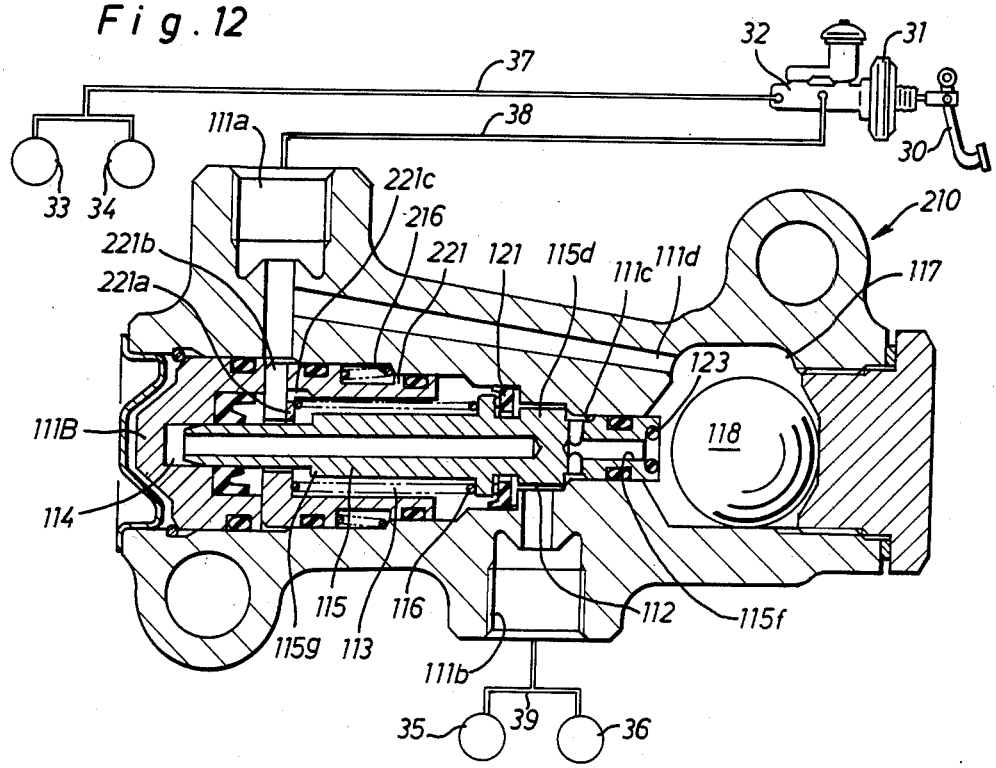

In FIG. 12 there is illustrated a further modification of the brake pressure control device 210 wherein a compression coil spring 216 is further arranged in surrounding relationship with the sleeve member 221 of FIG. 10. The compression coil spring 216 is engaged at its one end with an annular shoulder of sleeve member 221 and at its other end with an annular shoulder in stepped bore 111c to bias the sleeve member 221 leftwards against the master cylinder pressure PM. With this modification, the above-described equation (2) is modified as follows.

$$PW = \{[1 - AS/(AV-AL)] + [(AB-AC)/(AV-AL)]\}PM - FC/(AV-AL) \quad (3)$$

where
FC: the load of spring 216
AS: (AB−AC)

Figure 13:
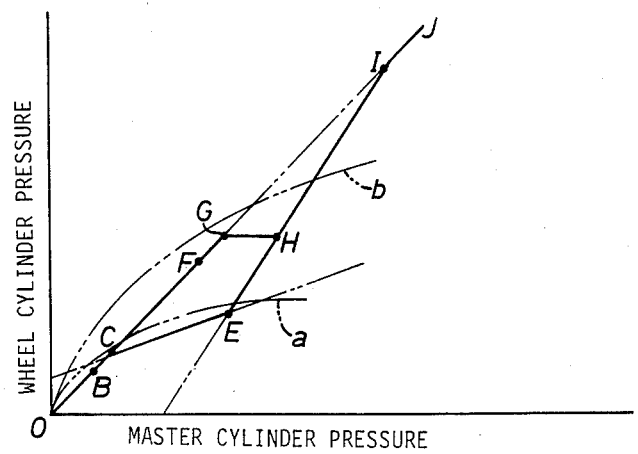

The pressure control characteristic of the modification is obtained as is illustrated in FIG. 13, in which a characteristic line under a light loaded condition of the vehicle is indicated by O-C-E-I-J, and a characteristic line under a heavy loaded condition of the vehicle is indicated by O-G-H-I-J.

Figure 14:
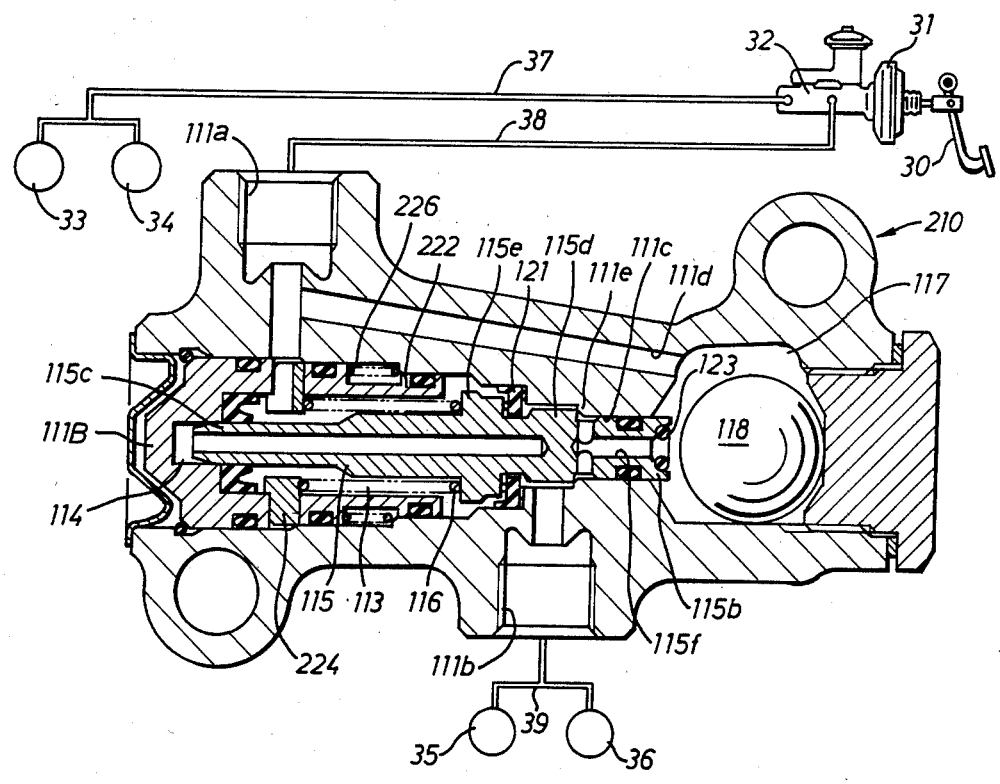

In FIG. 14 there is illustrated another modification of the brake pressure control device 210 wherein the sleeve member 220 of FIG. 6 is replaced with a sleeve member 222 axially movable in the stepped bore 111c. The sleeve member 222 is supported by a retainer member 224 which is formed with a radial groove in open communication with the inlet port 111a and is fixedly coupled with the inner end of plug 111B. In such an arrangement, the sleeve member 222 is biased leftwards by a compression coil spring 226 which is arranged in surrounding relationship with the sleeve member 222 and engaged at its one end with an annular shoulder in stepped bore 111c and an annular shoulder of sleeve member 222. The inner periphery of sleeve member 222 is smaller in diameter than the annular flange 115e of piston 115 to be abutted against the piston 115 in its rightward movement against spring 226. In addition, the left end of compression coil spring 116 is engaged with the retainer member 224 to bias the piston 115 rightwards in the figure.

Figure 15:
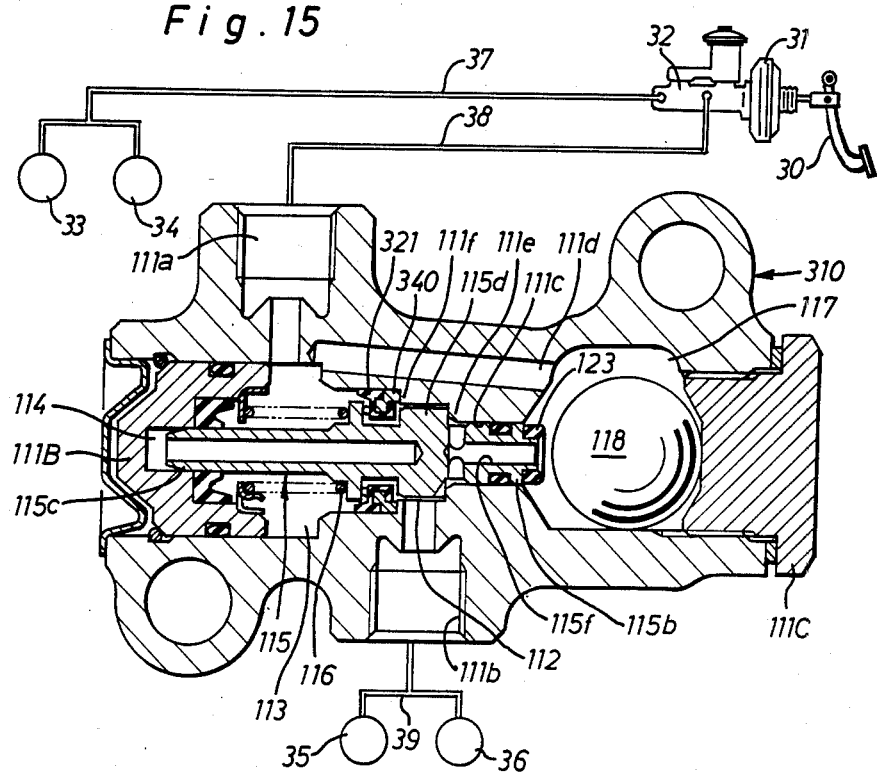
FIG. 15 is a sectional view of a third embodiment of a brake pressure control device according to the present invention.

In FIG. 15 there is illustrated a third embodiment of the present invention, in which a brake pressure control device 310 comprises an annular plunger 340 axially slidably disposed within the stepped bore 111c, and a first annular valve seat 321 secured to the annular plunger 340. The annular plunger 340 is positioned in place by abutment with the annular shoulder 111f in stepped bore 111c under the load of spring 116. In this embodiment, leftward movement of piston 115 is restricted by abutment of the left end of piston 115 against the inner wall of plug 111B in the air chamber 114. The initial load of spring 116 is determined to hold the piston 115 in its initial position until the rear wheel brake cylinder pressure PW reaches a first level to cause the predetermined deceleration of the vehicle under a light loaded condition and further to permit leftward movement of the piston 115 from its initial position before the rear wheel brake cylinder pressure reaches a second level to cause the predetermined deceleration of the vehicle under a heavy loaded condition. Other component parts and portions are substantially same as those in the first embodiment of FIG. 3 and indicated by the same reference numerals.

Figure 16:
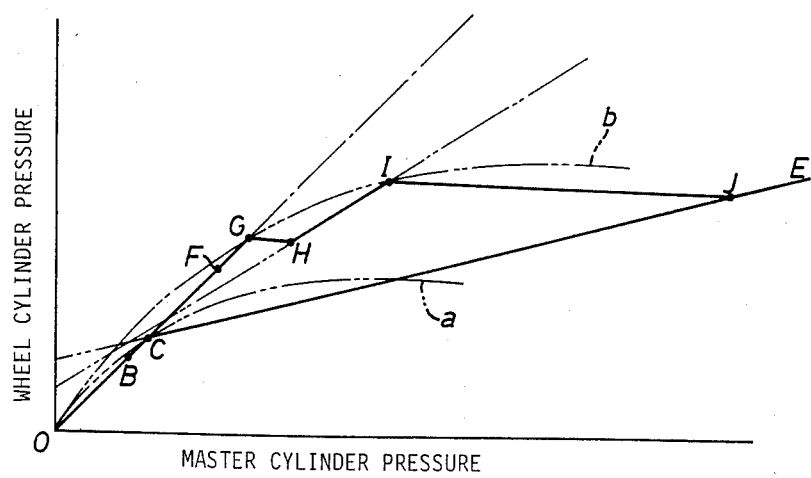
FIG. 16 is a graph illustrating a pressure control characteristic of the device shown in FIG. 15.

In FIG. 16 there is illustrated a pressure control characteristic of the brake pressure control device 310, in which a first imaginary line a indicates an ideal proportion curve under the light loaded condition of the vehicle, and a second imaginary line b indicates an ideal proportion curve under the heavy loaded condition of the vehicle. In the graph of FIG. 16, a level B on a solid line represents a hydraulic pressure applied to the rear wheel brake cylinders 35, 36 when subjected to the deceleration of the vehicle in excess of the predetermined value under the light loaded condition, and a level F on the solid line represents a hydraulic pressure applied to the rear wheel brake cylinders 35, 36 when subjected to the deceleration of the vehicle in excess of the predetermined value under the heavy loaded condition. A segment C - E is determined on a basis of the following equation.

$$PW = [1 - AS/(AV-AL)]PM + FP/(AV-AL)$$

where all the characters are substantially same as those in the first embodiment, provided that AS is smaller than AV - AL and larger than AB - AC.

In FIG. 16, a segment H - I is obtainable when the piston 115 are moved unitedly with the valve element 118, and also the annular plunger 340 and first annular valve seat 321 are moved leftwards by abutment with the annular valve part 115d of piston 115. The segment H - I is determined by the following equation.

$$PW = [1 - AS/(AV-AL)]PM + FP/(AV-AL)$$

Assuming that the control device 310 is applied with the master cylinder pressure under the light loaded condition of the vehicle, the deceleration of the vehicle will exceed the predetermined value when the master cylinder pressure PM has increased to the level B on the graph of FIG. 16. Under such a condition, the valve element 118 will start to roll forwardly towards the second annular valve seat 123. When the master cylinder pressure PM has increased to the level C on the graph of FIG. 16, engagement of the valve element 118 with the valve seat 123 will be effected to interrupt the fluid communication between the first and second fluid chambers 117 and 112. Subsequently, the piston 115 will move unitedly with the valve element 118 in response to further increase of the master cylinder pressure PM to cooperate with the first annular valve seat 321 thereby to effect a pressure proportioning action. Thus, the rear wheel brake cylinder pressure PW will be controlled as is illustrated by a characteristic line O-C-E in FIG. 16.

Assuming that the control device 310 is applied with the master cylinder pressure PM under the heavy loaded condition of the vehicle, the valve element 118 will start to roll forwardly when the master cylinder pressure PM has increased to the level F in FIG. 16. During such increase of the master cylinder pressure PM, the piston 115 will displace against the load of spring 116 and abut against the plunger 340 to increase the initial space between the valve element 118 and the valve seat 123. When the piston 115 abuts against the inner wall of plug 111B at its left end, the annular plunger 340 and annular valve seat 321 displaces leftwards. When the master cylinder pressure PM increases to a level G, engagement of the valve element 118 with the valve seat 123 is effected to interrupt the fluid communication between the first and second fluid chambers 117 and 112 so as to maintain the rear wheel brake cylinder pressure PW at the level G during further increase of the master cylinder pressure PM. When the master cylinder pressure PM increases to a level H, the piston 115 moves unitedly with the annular plunger 340, annular valve seat 321 and valve element 118 to increase the rear wheel brake cylinder pressure PW as is illustrated by a segment H - I in FIG. 16. When the rear wheel brake cylinder pressue PW increases to the level I, the annular plunger 340 abuts against the annular shoulder 111f in stepped bore 111c. Subsequently, the rear wheel brake cylinder pressure PW will be maintained at the level I during further increase of the master cylinder pressure PM, as is illustrated by a segment I - J in FIG. 16.

Figure 17:
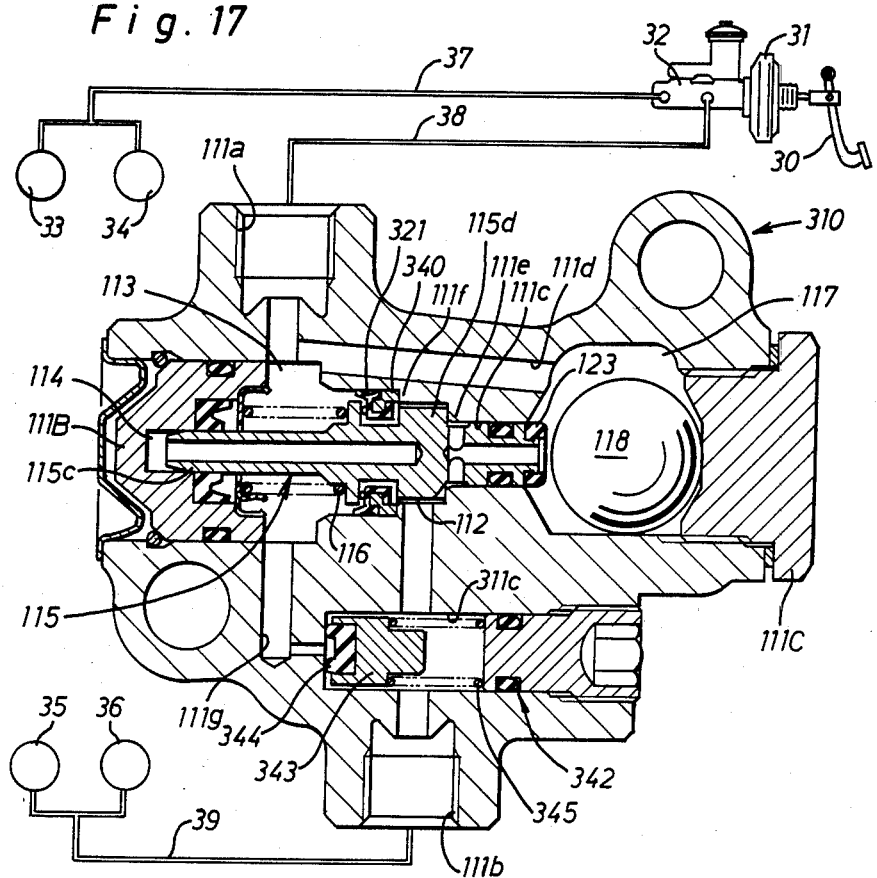
FIG. 17 illustrates a modification of the third embodiment.
Figure 18:
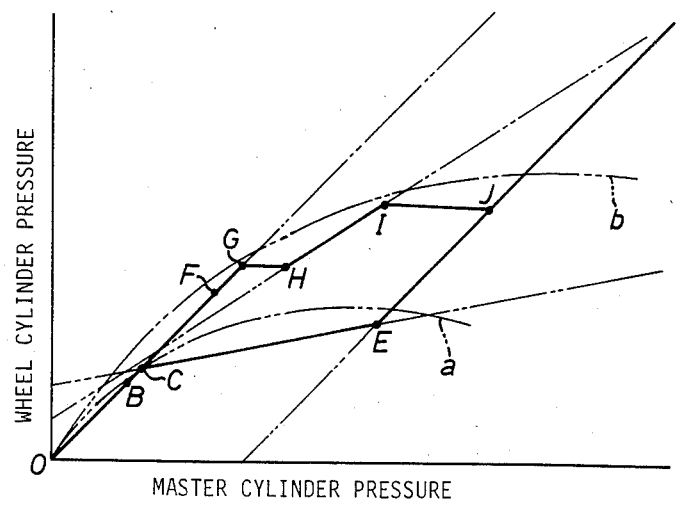
FIG. 18 is a graph illustrating a pressure control characteristic of the modification shown in FIG. 17.

In FIG. 17 there is illustrated a modification of the control device 310 of FIG. 15 wherein a normally closed bypass valve 342 is assembled within the housing body 111A to open when the difference between the pressures PM and PW reaches a predetermined value. The bypass valve 342 comprises a valve plunger 343 axially slidably disposed within an axial bore 311c in housing body 111A and loaded by a compression coil spring 345 leftwards. The axal bore 311c is located between the second fluid chamber 112 and the outlet port 111b and communicates at the left end thereof with the third fluid chamber 113 via a passage 111g. The valve plunger 343 is integrally provided with a valve member 344 which normally closes the passage 111g under the load of spring 345. When the master cylinder pressure PM has increased to a level E under a light loaded condition of the vehicle as is illustrated in FIG. 18, the bypass valve 342 opens to effect a direct fluid communication between the third fluid chamber 113 and the outlet port 111b. Alternatively, when the master cylinder pressure has increased to a level J under the heavy loaded condition of the vehicle as is illustrated in FIG. 18, the bypass valve 342 opens to effect a direct fluid communication between the third fluid chamber 113 and the outlet port 111b. Thus, the rear wheel brake cylinder pressure PW will be controlled as is illustrated by a characteristic line O-C-E-J-K or a characteristic line O-G-H-I-J-K in FIG. 18.

Figure 19:
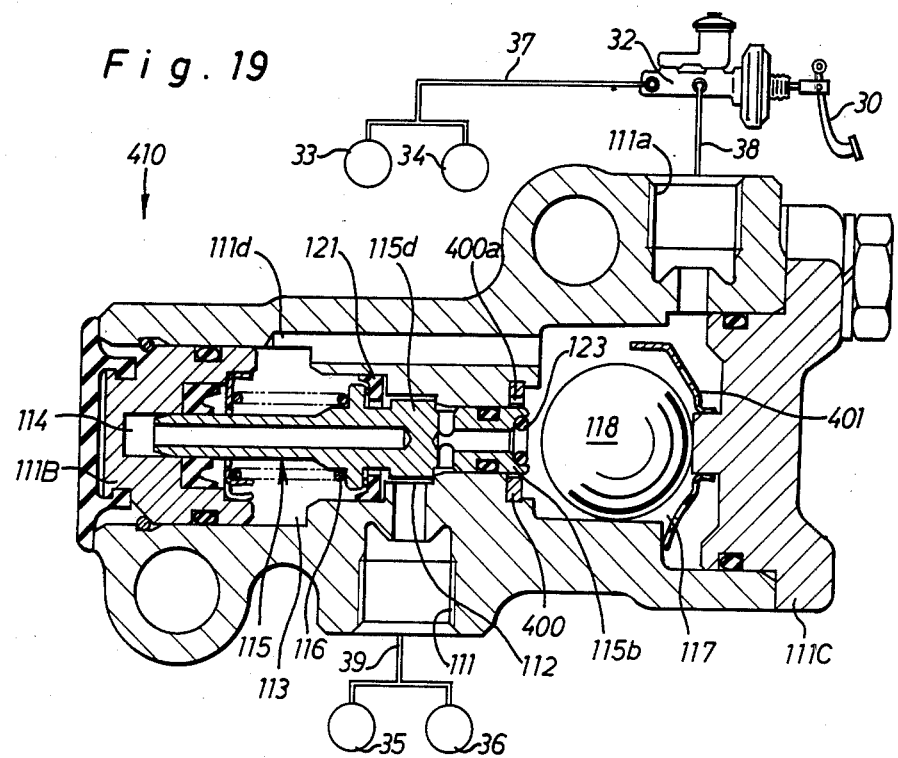
FIG. 19 is a sectional view of a fourth embodiment of a brake pressure control device according to the present invention.

In FIG. 19 there is illustrated a fourth embodiment of the present invention, in which a brake pressure control device 410 comprises an annular stop ring 400 secured to the end wall of the first fluid chamber 117, and a flow control plate 401 secured to the inner end of plug 111C. The annular stop ring 400 is formed with a radial recess 400a and arranged in surrounding relationship with the right end 115b of piston 115. The flow control plate 401 is arranged to control the flow of fluid into the first fluid chamber 117 from the inlet port 111a in braking operation. In such an arrangement, the load of spring 116 is determined to hold the piston 115 in its initial position until the rear wheel brake cylinder pressure PW reaches a first level to cause the predetermined deceleration of the vehicle under a light loaded condition and further to permit leftward movement of the piston 115 from its initial position before the rear wheel brake cylinder pressure PW reaches a second level to cause the predetermined deceleration of the vehicle under a heavy loaded condition. When the rear wheel brake cylinder pressure PW reaches the second level under the heavy loaded condition of the vehicle, the piston 115 abuts against the inner wall of plug 111B in the air chamber 114 to retract the second annular valve seat 123 from the annular stop ring 400. In such a condition, the valve element 118 is received by the annular stop ring 400, even when rolled forwardly, and does not engage the second annular valve seat 123 to permit the flow of fluid between the first and second fluid chambers 117 and 112. Other component parts and portions are substantially same as those in the first embodiment and indicated by the same reference numerals.

Figure 20:
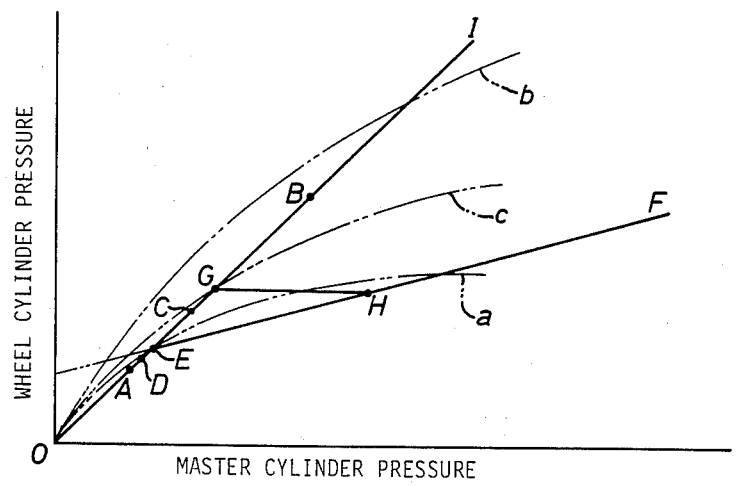
FIG. 20 is a graph illustrating a pressure control characteristic of the fourth embodiment.

Assuming that the control device 410 is applied with the master cylinder pressure PM under the light loaded condition of the vehicle, the deceleration of the vehicle will exceed the predetermined value when the master cylinder pressure PM has increased to a level A on the graph of FIG. 20. Under such a condition, the valve element 118 will start to roll forwardly towards the second annular valve seat 123. When the master cylinder pressure PM has further increased to a level D on the graph of FIG. 20, engagement of the valve element 118 with the valve seat 123 is effected to interrupt the fluid communication between the first and second fluid chambers 117 and 112. Subsequently, the piston 115 will move unitedly with the valve element 118 in response to further increase of the master cylinder pressure PM to cooperate with the first annular valve seat 121 so as to effect a pressure porportioning action. Thus, the rear wheel brake cylinder pressure PW is controlled as is illustrated by a characteristic line O-E-F in FIG. 20.

Assuming that the control device 410 is applied with the master cylinder pressure PM under a half loaded condition of the vehicle, the valve element 118 will start to roll forwardly towards the second annular valve seat 123 when the master cylinder pressure PM has increased to a level C on the graph of FIG. 20. During such increase of the master cylinder pressure PM to level C, the piston 115 will displace against the load of spring 116 and abut against the first annular valve seat 121 to increase the initial space between the valve element 118 and the second annular valve seat 123. When the master cylinder pressure has further increased to a level G, engagement of the valve element 118 with the valve seat 123 will be effected to interrupt the fluid communication between the first and second fluid chambers 117 and 112 so as to maintain the rear wheel brake cylinder pressure PW at the level G during further increase of the master cylinder pressure PM. When the master cylinder pressure PM has increased to a level H, the piston 115 will move unitedly with the valve element 118 to cooperate with the first annular valve seat 121 so as to effect the pressure proportioning action.

Assuming that the control device 410 is applied with the master cylinder pressure PM under the heavy loaded condition, the valve element 118 will start to roll forwardly when the master cylinder pressure PM has increased to a level B on the graph of FIG. 20. During such increase of the master cylinder pressure PM to the level B, the piston 115 will abut against the first annular valve seat 121 and further moves forwardly to retract the second annular valve seat 123 from the annular stop ring 400. As a result, the valve element 118 is received by the annular stop ring 400 to permit the fluid communication between the first and second fluid chambers 117 and 112 via the radial recess 400a in ring 400. Consequently, the rear wheel brake cylinder pressure PW will be controlled as is illustrated by a characteristic line O - I in FIG. 20.

Figure 21:
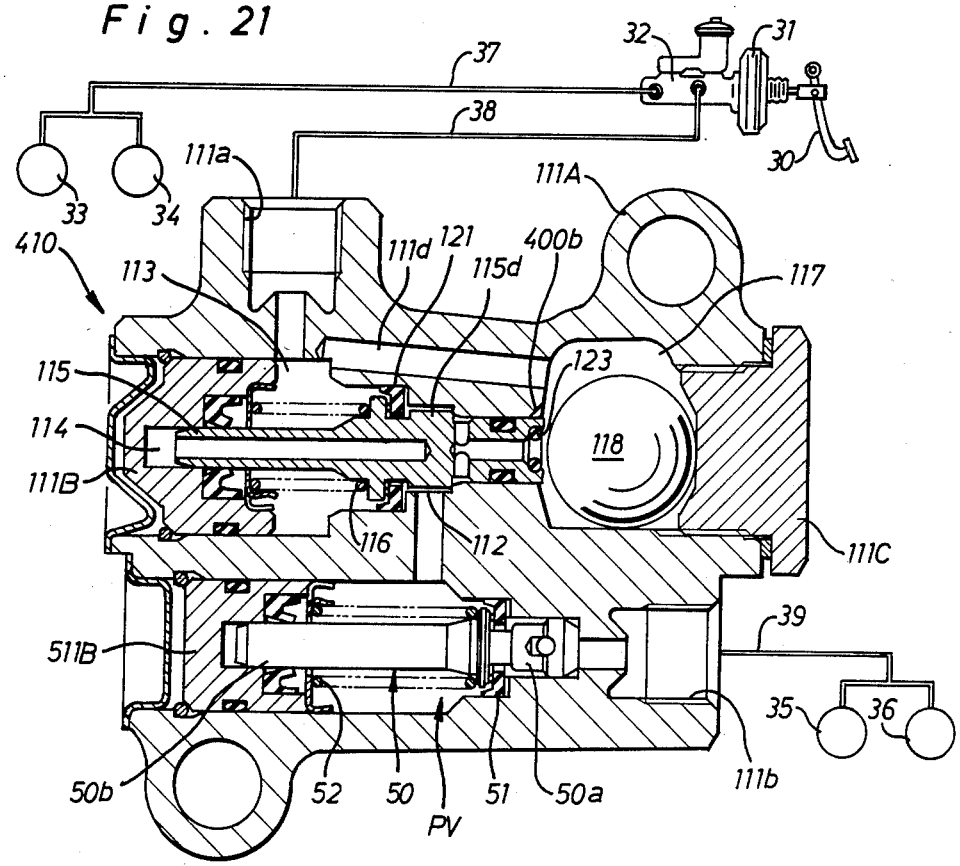
FIGS. 21 and 23 illustrate modifications of the fourth embodiment.

FIG. 21 illustrates a modification of the fourth embodiment wherein the annular stop ring 400 of FIG. 19 is replaced with a radial recess 400b formed in the end wall of the first fluid chamber 117 to permit the fluid communication between the first and second fluid chambers 117 and 112 when the valve element 118 is received by the end wall. This modification further comprises a proportioning valve PV disposed between the second fluid chamber 112 and the outlet port 111b to control the master cylinder pressure PM at a predetermined ratio. The proportioning valve PV comprises a differential piston 50, an annular sealing member 51 cooperable with an annular valve part 50a of piston 50, a compression coil spring 52 loading the piston 50 towards the outlet port 111b, and a plug 511B fixed to the housing body 111A in a fluid-tight manner to support a small diameter portion 50b of piston 50.

Figure 22:
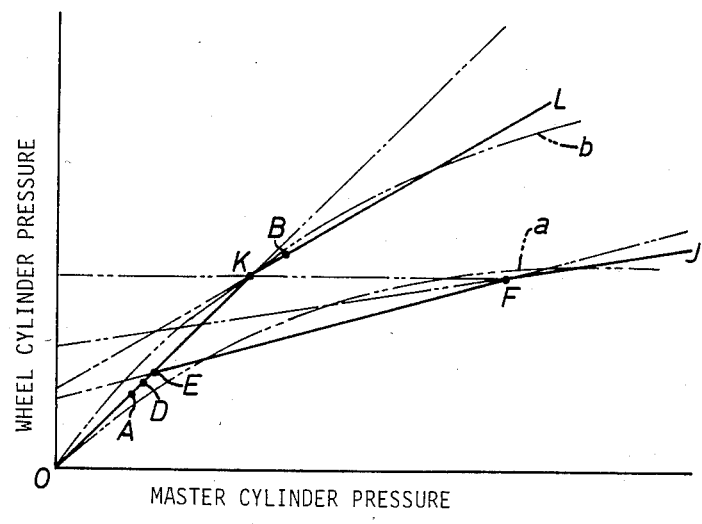
FIGS. 22 and 24 illustrate respective pressure control characteristics of the modifications shown in FIGS. 21 and 23.

In FIG. 22 there is illustrated a pressure control characteristic of the modified control device 410, in which segments F - J and K - L are respectively obtainable in operation of the proportioning valve PV. The segment F - J is determined by the following equation.

$$PW=[1-AS/(AB-AL)]PM+FP/(AB-AL) \quad (a)$$

where all the characters are substantially same as those in the first embodiment.

The segment K - L is determined by the following equation.

$$PW=[1-(AD/AT)]PM+FT/AT \quad (b)$$

where
AT: an effective sealing area between the annular valve part 50a of piston 50 and the annular sealing member 51,
AP: an effective sealing area between the small diameter portion 50b of piston 50 and the plug 511B,
FT: the load of spring 52 when the annular valve part 50a has been in engagement with the annular sealing member 51.

Assuming that the modified device 410 is applied with the master cylinder pressure PM under a light loaded condition of the vehicle, the proportioning valve PV will start to operate when the master cylinder pressure PM has increased to the level F on the graph of FIG. 22. If applied with the master cylinder pressure PM under a heavy loaded condition of the vehicle, the proportioning valve PV will start to operate when the master cylinder pressure PM has increased to the level K on the graph of FIG. 22. When the master cylinder pressure PM has increased to a level B on the graph, the first annular valve seat 123 will be retracted from the end wall of first fluid chamber 117 so that the valve element 118 is received by the ender wall to permit the fluid communication between the first and second fluid chambers 117 and 112 via the radial recess 400b.

Figure 23:
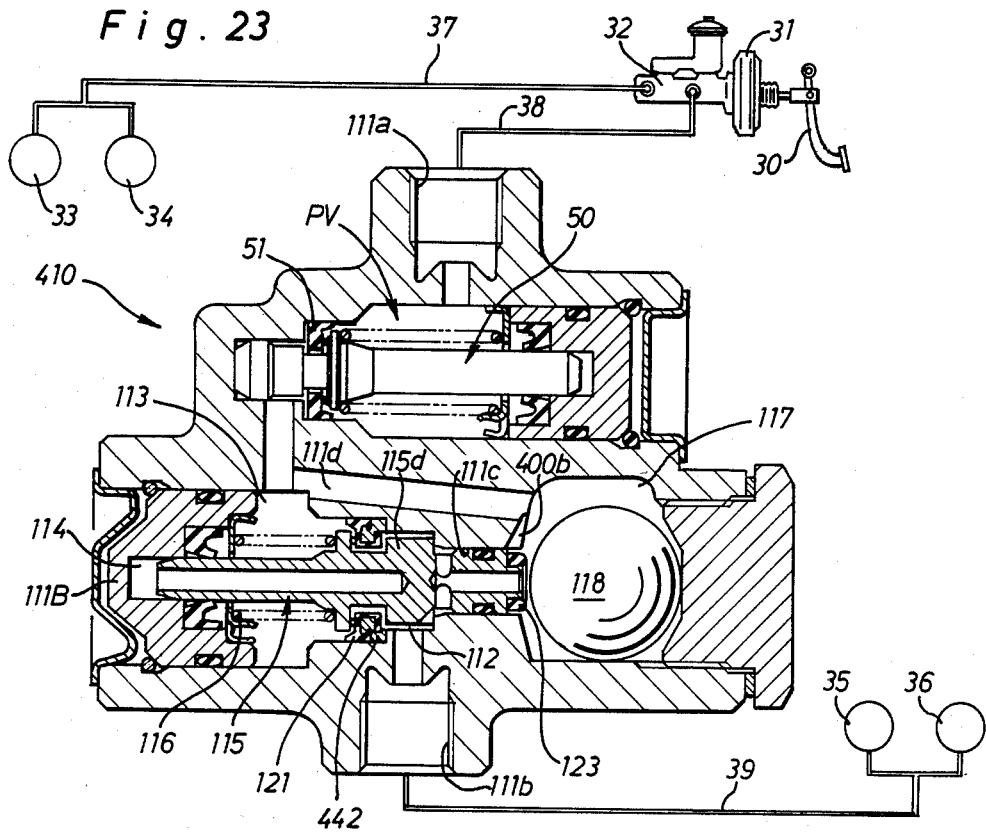

In FIG. 23 there is illustrated another modification of the fourth embodiment wherein the proportioning valve PV of FIG. 21 is disposed between the inlet port 111a and the third fluid chamber 113. In this modification, an annular plunger 442 is axially slidably disposed within the stepped bore 111c in surrounding relationship with the annular valve part 115d of piston 115, and the first annular valve seat 121 is fixed to the annular plunger 442.

Figure 24:
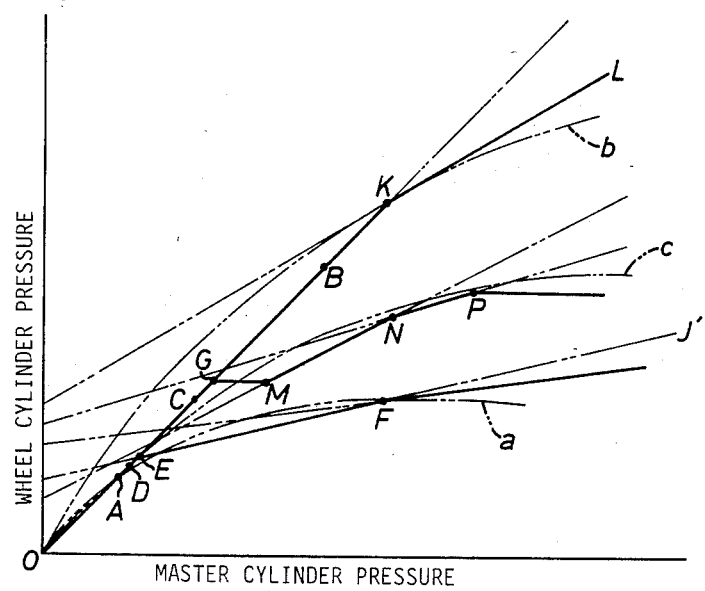

In FIG. 24 there is illustrated a pressure control characteristic of the modified device of FIG. 23, in which a segment F - J' corresponds with the segment F - J in FIG. 22 and is determined by the following equation.

$$PW=\{[1-AS/(AV-AL)](1-AP/AT)\}PM+[-1-AS/(AV-AL)](FT/AT)+FP/(AV-AL)$$

Assuming that the modified device of FIG. 23 is applied with the master cylinder pressure PM under a light loaded condition of the vehicle, the rear wheel brake cylinder pressure PW is controlled in response to increase of the master cylinder pressure PM as is illustrated by a characteristic line O - E - F in FIG. 24. When the master cylinder pressure PM has increased to the level F, the proportioning valve PV will start to operate so as to control the rear wheel brake cylinder pressure PW as is illustrated by the segment F - J' in FIG. 24. In case the modified device of FIG. 23 is applied with the master cylinder pressure PM under a half loaded condition, the rear wheel brake cylinder pressure PW is controlled in response to increase of the master cylinder pressure PM as is illustrated by a characteristic line O - G - M in FIG. 24. During such increase of the master cylinder pressure PM to the level G, the piston 115 will displace unitedly with the annular plunger 442 leftwards. When the master cylinder pressure PM has increased to a level M, the piston 115 and plunger 442 will start to displace rightwards to increase the wheel brake cylinder pressure PW. When the master cylinder pressure PM has further increased to a level N, the proportioning valve PV will start to operate. Subsequently, the plunger 442 returns to its initial position in response to further increase of the master cylinder pressure PM to a level P. Consequently, the rear wheel brake cylinder pressure PW is controlled as is illustrated by a characteristic line M - N - P - Q in FIG. 24. In this case, the segment M - N is determined by the following equation.

$$PW=[1-AS/(AB-AL)]PM+FP/(AB-AL)$$

The segment N - P is determined by the following equation.

$$PW=[1-AS/(AB-AL)][1-AP/AT]PM+[1+AS/(AB-AL)][FT/AT]+FP/(AB-AL)$$

where all the characters are substantially same as those in the embodiments previously described, provided that AB represents an effect sealing area between the plunger 442 and the inner wall of stepped bore 111c.

Figure 25:
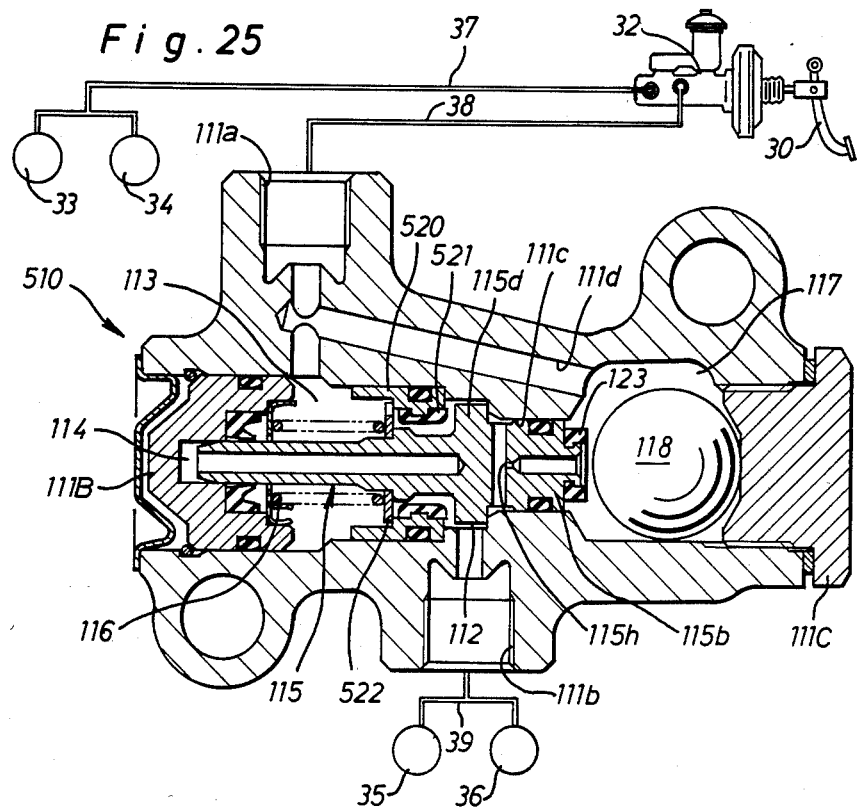
FIG. 25 is a sectional view of a fifth embodiment of a brake pressure control device according to the present invention.

In FIG. 25 there is illustrated a fifth embodiment of the present invention, in which a brake pressure control device 510 comprises a pressure responsive sleeve member 520 axially slidable in the stepped bore 111c of housing assembly 111 and in surrounding relationship with the piston 115. A first annular valve seat 521 is secured to the inner periphery of sleeve member 520 to cooperate with the annular valve part 115d of piston 115. In such an arrangement, the right end of compression spring 116 is engaged with an annular shoulder of sleeve member 520 and an annular shoulder of piston 115 through an annular retainer 522. Furthermore, the piston 115 is formed in the right end portion 115b with an orifice 115h. Other component parts and portions are substantially same as those in the first embodiment and indicated by the same reference numerals.

Figure 26:
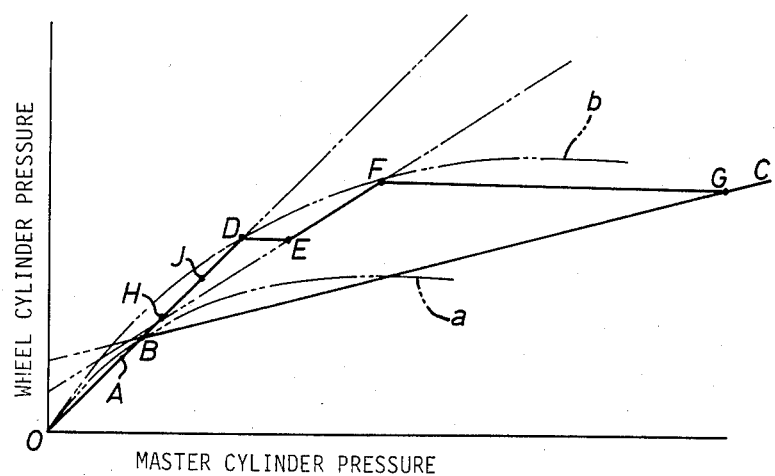
FIG. 26 is a graph illustrating a pressure control characteristic of the fifth embodiment.

In FIG. 26 there is illustrated a pressure control characteristic of the control device 510, in which a segment B - C is determined on a basis of the following equation (i), and a segment E - F is determined on a basis of the following equation (ii).

$$PW = [1 - AS/(AV-AL)]PM + FP/(AV-AL) \quad (i)$$

$$PW = [1 - AS/(AS=AL)]PM + FP/(AB-AL) \quad (ii)$$

where all the characters are substantially same as those in the embodiments previously described, provided that AS respresents an effective pressure receiving area of the sleeve member 520.

Assuming that the control device 510 is applied with the master cylinder pressure PM under a light loaded condition of the vehicle, the deceleration of the vehicle will exceed the predetermined value when the master cylinder pressure PM has increased to a level A. Under such a condition, the valve element 118 is brought into engagement with the second annular valve seat 123 to interrupt the fluid communication between the first and second fluid chambers 117 and 112. Subsequently, the annular valve part 115d of piston 115 abuts against the first annular valve seat 521 in response to further increase of the master cylinder pressure PM to a level B. Thereafter, the piston 115 will move unitedly with the valve element 118 in response to further increase of the master cylinder pressure PM to cooperate with the first annular valve seat 521 so as to control the rear wheel brake cylinder pressure PW as is illustrated by the segment B - C in FIG. 26. Consequently, the rear wheel brake cylinder pressure PW is controlled as is illustrated by a characteristic line O - A - B - C in FIG. 26.

Assuming that the control device 510 is applied with the master cylinder pressure PM under a heavy loaded condition of the vehicle, the annular valve part 115d of piston 115 is brought into engagement with the first annular valve seat 521 when the master cylinder pressure PM has increased to the level B. Subsequently, the piston 115 will displace unitedly with the sleeve member 520 leftwards in response to further increase of the master cylinder pressure PM to a level H and abuts against the inner wall of plug 111B in response to further increase of the master cylinder pressure PM to a level J. When the master cylinder pressure PM has increased to a level D, the deceleration of the vehicle will exceed the predetermined value, and the valve element 118 will be brought into engagement with the second annular valve seat 123 to interrupt the fluid communication between the first and second fluid chambers 117 and 112 so as to maintain the rear wheel brake cylinder PW at the level D during further increase of the master cylinder pressure PM. When the master cylinder pressure PM has increased to a level E, the piston 115 and sleeve member 520 will start to displace rightwards so as to increase the rear wheel brake cylinder pressure PW. When the master cylinder pressure PM has increased to a level F, the sleeve member 520 abuts against an annular shoulder in stepped bore 111c to maintain the rear wheel brake cylinder pressure PW at the level F during further increase of the master cylinder pressure PM. After the master cylinder pressure has further increased to a level G, the rear wheel brake cylinder pressure PW will be controlled by operation of the piston 115. Consequently, the rear wheel brake cylinder pressure PW is controlled as is illustrated by a characteristic line O - B - D - E - F - G - C in FIG. 26.

Figure 27:
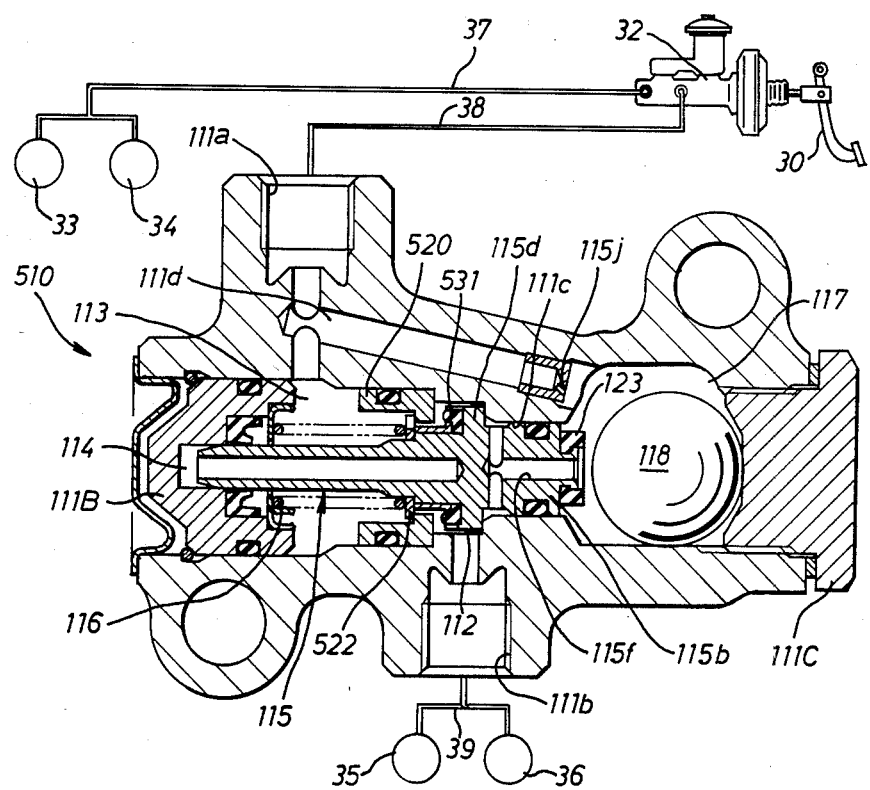
FIG. 27 illustrates a modification of the fifth embodiment.

In FIG. 27 there is illustrated a modification of the fifth embodiment wherein the orifice 115h of FIG. 25 is replaced with an orifice 115j disposed within the passage 111d and wherein the first annular valve seat 521 is replaced with a first annular valve seat 531 secured to the annular valve part 115d of piston 115 to cooperate with the right end of sleeve member 520. Other component parts and portions are substantially same as those in the fifth embodiment. In operation of this modification, the rear wheel brake cylinder pressure is controlled substantially same as that in the fifth embodiment.

Figure 28:
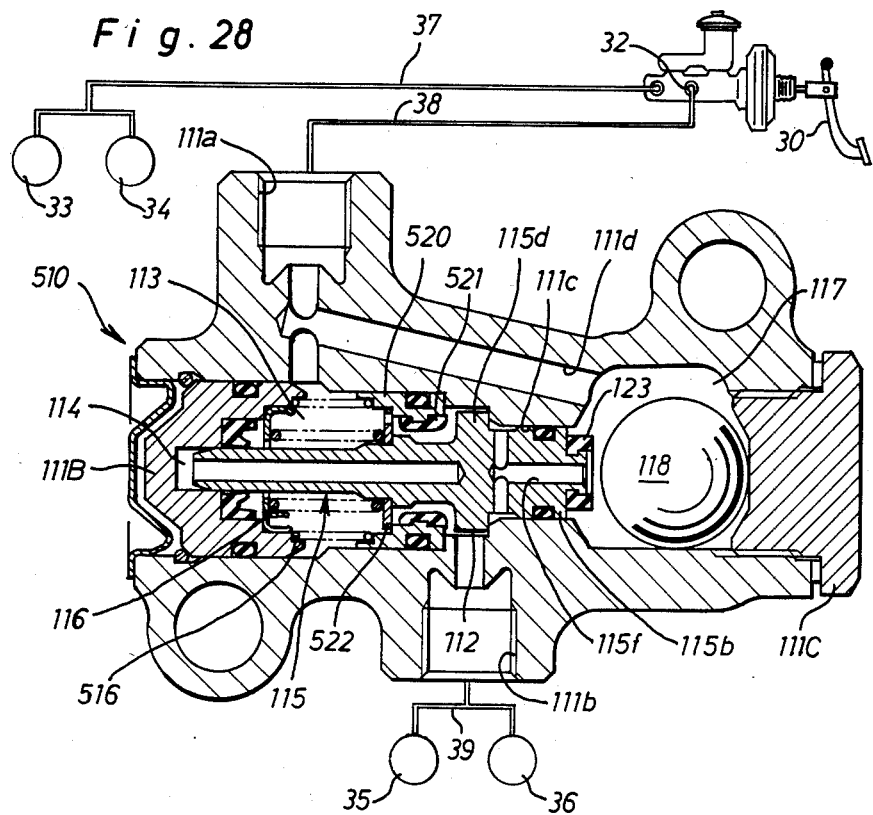
FIG. 28 illustrates another modification of the fifth embodiment.

In FIG. 28 there is illustrated another modification of the fifth embodiment wherein a compression coil spring 516 is arranged in surrounding relationship with the spring 116 and wherein the orifice 115h of FIG. 25 is eliminated. The coil spring 516 is engaged at its one end with an inner shoulder of plug 111B and at its other end with the left end of sleeve member 520 to bias the sleeve member 520 towards the annular shoulder in stepped bore 111c.

Figure 29:
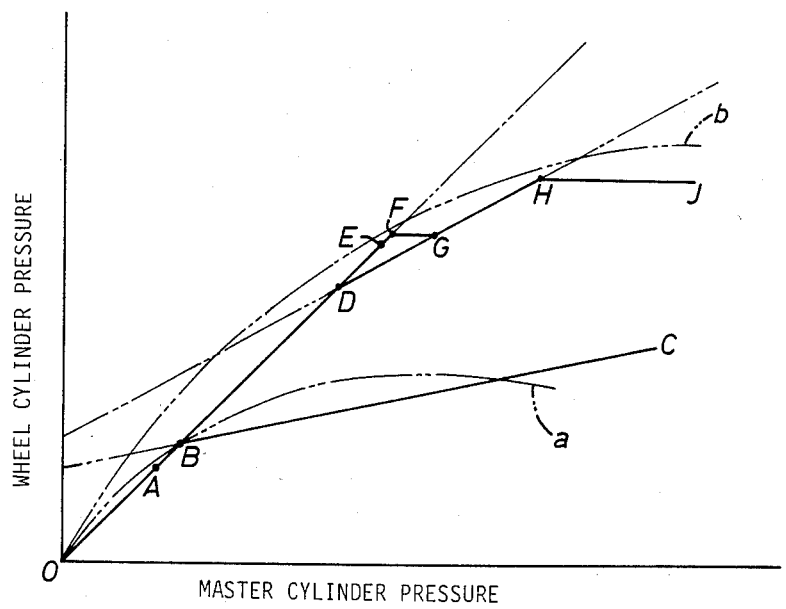
FIG. 29 is a graph illustrating a pressure control characteristic of the modification shown in FIG. 28.

In FIG. 29 there is illustrated a pressure control characteristic of the modification, in which a segment B-C is determined on a basis of the following equation (I), and a segment G - H is determined on a basis of the following equation (II).

$$PW = [1 - AS/(AV-AL)]PM + FP/(AV-AL) \quad (I)$$

$$PW = [1 - AS/(AC-AL)]PM + (FP+FC)/(AC-AL) \quad (II)$$

where all the characters are substantially same as those in the embodiments previously described, provided that AC respresents an effective pressure receiving area of the sleeve member 520, and FC represents the load of coil spring 516.

Assuming that the modified device of FIG. 28 is applied with the master cylinder pressure PM under a light loaded condition of the vehicle, the deceleration of the vehicle will exceed the predetermined value when the master cylinder pressure PM has increased to a level A. Under such a condition, the valve element 118 is brought into engagement with the second annular valve seat 123 to interrupt the fluid communication between the first and second fluid chambers 117 and 112. Subsequently, the annular valve part 115d of piston 115 abuts against the first annular valve seat 521 in response to further increase of the master cylinder pressure PM to a level B. Thereafter, the rear wheel brake cylinder pressure PW is controlled by operation of the piston 115 as is illustrated by the segment B - C in FIG. 29. Consequently, the rear wheel brake cylinder pressure PW is controlled as is illustrated by a characteristic line O - A - B - C in FIG. 29.

Assuming that the modified device of FIG. 28 is applied with the master cylinder pressure PM under a heavy loaded condition of the vehicle, the annular valve part 115d of piston 115 will be brought into engagement with the first annular valve seat 521 when the master cylinder pressure PM has increased to the level B. Subsequently, the piston 115 will displace unitedly with the sleeve member 520 leftwards in response to further increase of the master cylinder pressure PM to a level D and abuts against the inner wall of plug 111B in response to further increase of the master cylinder pressure PM to a level E. When the master cylinder pressure PM has increased to a level F, the deceleration of the vehicle will exceed the predetermined value, and the valve element 118 will be brought into engagement with the second annular valve seat 123 to interrupt the fluid communication between the first and second fluid chambers 117 and 112 so as to maintain the rear wheel brake cylinder PW at the level F during further increase of the master cylinder pressure PM. When the master cylinder pressure PM has increased to a level G, the piston 115 and sleeve member 520 will start to displace rightwards so as to increase the rear wheel brake cylinder pressure PW. When the master cylinder pressure PM has increased to a level H, the sleeve member 520 will abut against the annular shoulder in stepped bore 111c to maintain the rear wheel brake cylinder pressure PW at the level H during further increase of the master cylinder pressure PM. Consequently, the rear wheel brake cylinder pressure will be controlled as is illustrated by a characteristic line O - B - F - G - H - J in FIG. 29.

What is claimed is:

1. A brake pressure control device for a vehicle braking system for incorporation between a master cylinder and a wheel brake cylinder, comprising:

a housing provided with an inlet port for connection to said master cylinder, an outlet port for connection to said wheel brake cylinder, and a stepped bore in open communication with said inlet and outlet ports;

a pressure responsive piston axially slidably disposed within said stepped bore to subdivide the interior of said housing into first, second and third fluid chambers, said first fluid chamber being in open communication with said inlet port, said second fluid chamber being in open communication with said outlet port, and said third fluid chamber being in open communication with said inlet port and with said outlet port through said second fluid chamber, said piston being formed at one end portion thereof with a passage for providing a fluid communication between said first and second fluid chambers and at an intermediate portion thereof with a valve part located within said second fluid chamber;

a first annular valve seat arranged within said stepped bore between said second and third fluid chambers to cooperate with the valve part of said piston for controlling the flow of fluid between said second and third fluid chambers;

a spring arranged within said third fluid chamber for loading said piston towards said first fluid chamber and retaining it in an initial position in which the valve part of said piston is spaced from said first annular valve seat;

a second annular valve seat fixed to the one end portion of said piston, said second annular valve seat being exposed within said first fluid chamber and arranged in surrounding relationship with the passage in said piston; and an inertia-controlled valve element in the form of a ball contained within said first fluid chamber to cooperate with said second annular valve seat, said valve element being placed in an initial position in which it is in abutment with an end wall of said stepped bore to be spaced from said second annular valve seat when the deceleration of the vehicle is below a predetermined value, and said valve element being brought into engagement with said second annular valve seat when subjected to the deceleration of the vehicle in excess of the predetermined value;

wherein said piston is arranged to be displaced against said spring to increase a space between said second annular valve seat and said valve element before the deceleration of the vehicle reaches the predetermined value under a heavy loaded condition.

2. A brake pressure control device as claimed in claim 1, wherein said second fluid chamber is in the formof an annular chamber formed around the valve part of said piston and being in communication with said first fluid chamber through the passage in said piston and with said third fluid chamber through said first annular valve seat.

3. A brake pressure control device as claimed in claim 1, wherein said first annular valve seat is an annular sealing member supported in place by abutment with an annular shoulder in said stepped bore to be axially displaced by engagement with the valve part of said piston.

4. A brake pressure control device as claimed in claim 1, further comprising a sleeve member arranged in surrounding relationship with said piston in said third fluid chamber to be applied with a hydraulic pressure from said master cylinder through said inlet port and to be axially displaced by the hydraulic pressure towards said second fluid chamber, and wherein said spring is engaged at one end thereof with said piston and at the other end thereof with said sleeve member to increase the spring load acting on said piston in braking operation under a heavy loaded condition of the vehicle.

5. A brake pressure control device as claimed in claim 4, wherein a second compression coil spring is arranged in surrounding relationship with said sleeve member and engaged at one end thereof with said sleeve member and at the other end thereof with an annularshoulder in said stepped bore to bias said sleeve member against the hydraulic pressure from said master cylinder.

6. A brake pressure control device as claimed in claim 4, wherein said sleeve member is arranged to be engaged with an annular shoulder of said piston in said third fluid chamber when axially displaced against the load of said spring acting on said piston.

7. A brake pressure control device as claimed in claim 5, wherein said sleeve member is arranged to be engaged with an annular shoulder of said piston in said third fluid chamber when axially displaced against the load of said spring acting on said piston.

8. A brake pressure control device as claimed in claim 1, further comprising a retainer member arranged within said third fluid chamber to be applied with a hydraulic pressure from said master cylinder through said inlet port and to be axially displaced by the hydraulic pressure towards said second fluid chamber, a sleeve member arranged in surrounding relationship with said piston in said third fluid chamber and axially movable to be abutted against an annular flange of said piston, and a second compression coil spring arranged in surrounding relationship with said sleeve member and engaged at one end thereof with an annular shoulder in said stepped bore and at the other end thereof with said sleeve member to bias said sleeve member towards said retainer member, and wherein said first-named spring is engaged at one end thereof with the annular flange of said piston and at the other end thereof with said retainer member.

9. A brake pressure control device as claimed in claim 1, further comprising an annular plunger axially movable in said stepped bore and retained in place by abutment with an annular shoulder in said stepped bore under the load of said spring to be abutted against the valve part of said piston, and wherein said first annular valve seat is an annular sealing member secured to said annular plunger.

10. A brake pressure control device as claimed in claim 9, further comprising a normally closed bypass valve disposed between said second fluid chamber and said outlet port to provide a direct fluid communication between said third fluid chamber and said outlet port when opened by the difference in pressure between the master cylinder pressure and the wheel brake cylinder pressure.

11. A brake pressure control device as claimed in claim 1, further comprising means for receiving said valve element and permitting the flow of fluid between said first and second fluid chambers when said second annular valve seat is retracted from said first fluid chamber.

12. A brake pressure control device as claimed in claim 11, wherein said means for receiving said valve element is an annular stop ring secured to an end wall of said first fluid chamber in surrounding relationship with said second annular valve seat, said stop ring being formed with a radial recess for a fluid communication between said first and second fluid chambers.

13. A brake pressure control device as claimed in claim 11, wherein said means for receiving said valve element is in the form of an end wall of said first fluid chamber around said second annular valve seat, said end wall being formed with a radial recess for a fluid communiction between said first and second fluid chambers.

14. A brake pressure control device as claimed in claim 11, further comprising a proportioning valve disposed between said second fluid chamber and said outlet port to control a hydraulic pressure controlled by said piston.

15. A brake pressure control device as claimed in claim 11, further comprising a proportioning valve disposed between said inlet port and said first and third fluid chambers to control a hydraulic pressure applied from said master cylinder.

16. A brake pressure control device as claimed in claim 11, further comprising an annular plunger axially movable in said stepped bore and retained in place by abutment against an annular shoulder in said stepped bore, and wherein said first annular valve seat is an annular sealing member secured to said annular plunger to cooperate with the valve part of said piston.

17. A brake pressure control device as claimed in claim 1, further comprising a sleeve member arranged in surrounding relationship with said piston in said third fluid chamber and retained in place by abutment with an annular shoulder in said stepped bore to be axially moved, and wherein said first annular valve seat is an annular sealing member secured to the inner periphery of said sleeve member to cooperate with the valve part of said piston, and said spring is engaged at one end thereof with said piston and sleeve member and at the other end thereof with an end wall of said stepped bore.

18. A brake pressure control device as claimed in claim 17, wherein said piston is formed therein with an orifice located in the passage for the fluid communication between said first and second fluid chambers.

19. A brake pressure control device as claimed in claim 1, further comprising a sleeve member arranged in surrounding relationship with said piston in said third fluid chamber and retained in place by abutment with an annular shoulder in said stepped bore to be axially moved, and wherein said first annular valve seat is an annular sealing member secured to the valve part of said piston to cooperate with said sleeve member, and said spring is engaged at one end thereof with said piston and sleeve member and at the other end thereof with an end wall of said stepped bore.

20. A brake pressure control device as claimed in claim 19, wherein an orifice is provided in a passage between said inlet port and said first fluid chamber.

21. A brake pressure control device as claimed in claim 17, further comprising a second compression coil spring arranged in surrounding relationship with said first-named spring and engaged at one end thereof with said sleeve member and at the other end thereof with the end wall of said stepped bore to bias said sleeve member towards the annular shoulder in said stepped bore.

* * * * *